United States Patent
Niu et al.

(10) Patent No.: US 11,973,691 B2
(45) Date of Patent: Apr. 30, 2024

(54) DATA TRANSMISSION METHOD, DEVICE, AND WIRELESS NETWORK SYSTEM

(71) Applicant: HUAWEI TECHNOLOGIES CO., LTD., Guangdong (CN)

(72) Inventors: Xiangping Niu, Nanjing (CN); Hanyu Wei, Nanjing (CN); Yinliang Hu, Nanjing (CN); Chao Hou, Shenzhen (CN); Shike Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 920 days.

(21) Appl. No.: 16/992,784

(22) Filed: Aug. 13, 2020

(65) Prior Publication Data

US 2020/0374235 A1    Nov. 26, 2020

Related U.S. Application Data

(63) Continuation of application No. PCT/CN2019/074508, filed on Feb. 1, 2019.

(30) Foreign Application Priority Data

Feb. 13, 2018  (CN) .......................... 201810148910.2

(51) Int. Cl.
*H04L 1/18*    (2023.01)
*H04L 5/00*    (2006.01)
(Continued)

(52) U.S. Cl.
CPC ........ *H04L 47/2483* (2013.01); *H04L 5/0044* (2013.01); *H04L 43/026* (2013.01); *H04L 45/30* (2013.01)

(58) Field of Classification Search
CPC . H04L 47/2483; H04L 5/0044; H04L 43/026; H04L 45/30
See application file for complete search history.

(56) References Cited

U.S. PATENT DOCUMENTS 9,137,703 B2 * 9/2015 Nadas ................... H04L 1/1838
2011/0116443 A1 5/2011 Yu et al.
(Continued)

FOREIGN PATENT DOCUMENTS

| CN | 101990241 A | 3/2011 |
| CN | 102595495 A | 7/2012 |

(Continued)

OTHER PUBLICATIONS

EP Communication Pursuant to Article 94(3) EPC in European Appln No. 19755123.7 , dated Jan. 4, 2023, 8 pages.
(Continued)

*Primary Examiner* — Christine T. Tu
(74) *Attorney, Agent, or Firm* — Fish & Richardson P.C.

(57) ABSTRACT

This application provides data transmission methods, devices, and systems. In one implementation, a method comprises: receiving, by a central device of a wireless network, at least one first data packet sent by a remote device of the wireless network, wherein each of the at least one first data packet comprises a sequence number indicating a relative location of a payload of the corresponding first data packet in a second data packet; reordering, by the central device, the at least one first data packet, based on the sequence number of each of the at least one first data packet, to obtain the second data packet; and sending, by the central device, the second data packet.

17 Claims, 11 Drawing Sheets

(51) Int. Cl.
 *H04L 43/026* (2022.01)
 *H04L 45/30* (2022.01)
 *H04L 47/2483* (2022.01)

(56) References Cited

U.S. PATENT DOCUMENTS

| | | | |
|---|---|---|---|
| 2017/0064679 A1 | 3/2017 | Zhang et al. | |
| 2017/0171060 A1* | 6/2017 | Liu | H04L 67/60 |
| 2017/0295516 A1 | 10/2017 | Gao et al. | |
| 2018/0183723 A1* | 6/2018 | Cariou | H04L 69/22 |

FOREIGN PATENT DOCUMENTS

| | | | |
|---|---|---|---|
| CN | 103595646 | A | 2/2014 |
| CN | 105099803 | A | 11/2015 |
| CN | 105228195 | A | 1/2016 |
| CN | 105451219 | A | 3/2016 |
| CN | 106550463 | A | 3/2017 |
| CN | 107094299 | A | 8/2017 |
| CN | 107579949 | A | 1/2018 |
| WO | 2015168951 | A1 | 11/2015 |
| WO | 2017035724 | A1 | 3/2017 |
| WO | 2020146401 | A1 | 7/2020 |

OTHER PUBLICATIONS

IEEE Std 802.3-2015, "IEEE Standard for Ethernet," IEEE Computer Society, Sep. 3, 2015, 4017 pages.
IEEE Std 802.11-2016 (Revision of IEEE Std 802.11-2012), "Part 11: Wireless LAN Medium Access Control (MAC) and Physical Layer (PHY) Specifications," IEEE Computer Society, Dec. 2016, 3534 pages.
Office Action issued in Chinese Application No. 201810148910.2 dated Apr. 20, 2020, 18 pages (with English translation).
PCT International Search Report and Written Opinion issued in International Application No. PCT/CN2019/074508 dated May 7, 2019, 18 pages (with English translation).
Extended European Search Report issued in European Application No. 19755123.7 dated Feb. 22, 2021, 9 pages.
Lin et al., "RAN Revolution with NGFI (xhaul) for 5G," Journal of Lightwave Technology, vol. 36, No. 2, Jan. 15, 2018, 10 pages.
Saif et al., "An Enhanced A-MSDU Frame Aggregation Scheme for 802.11n Wireless Networks," Wireless Personal Communications, Kluwer Academic Publishers, vol. 66, No. 4, Jun. 22, 2011, 24 pages.
IEEE P802.11ax/D2.0, "Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN," Oct. 2017, 596 pages.

* cited by examiner

DATA TRANSMISSION METHOD, DEVICE, AND WIRELESS NETWORK SYSTEM

CROSS-REFERENCE TO RELATED APPLICATIONS

This application is a continuation of International Application No. PCT/CN2019/074508, filed on Feb. 1, 2019, which claims priority to Chinese Patent Application No. 201810148910.2, filed on Feb. 13, 2018. The disclosures of the aforementioned applications are hereby incorporated by reference in their entireties.

TECHNICAL FIELD

This application relates to the field of data transmission, and more specifically, to a data transmission method, a device, and a wireless network system.

BACKGROUND

A wireless fidelity (wireless fidelity, Wi-Fi) technology is a technology that allows an electronic device to access a wireless local area network (wireless local area network, WLAN). Currently, a Wi-Fi architecture evolves from a conventional independent access point (access point, AP) Wi-Fi architecture to a distributed Wi-Fi architecture. The distributed Wi-Fi architecture includes a central AP, and a plurality of remote radio units (remote radio unit, RRU) or a plurality of remote units (remote unit, RU). The following uses an RRU as an example for description. The central AP corresponds to a user management function of an independent AP, and is responsible for managing data forwarding between a user of each RRU and the RRU, and the like. The RRU is responsible for sending a remote radio frequency signal, and performing a Wi-Fi access function, a data processing function, and the like.

In terms of a hardware structure, currently internal hardware and a chip architecture of the RRU are the same as internal hardware and a chip architecture of the independent AP. A difference from the independent AP lies in that, a user management function at a logical level is shifted from the RRU up to the central AP. Because the data processing function is still retained on the RRU, the RRU needs a central processing unit (central processing unit, CPU) and a buffer (buffer) to participate in a data plane processing process. Costs of the CPU and the buffer inside the RRU (on a chip) occupy 50% or even more of total chip costs. With an increase in an air interface rate and an increase in a quantity of stations (station, STA) served by the RRU, the RRU needs to be disposed with a stronger CPU and more buffers. Adding the CPU and the buffer inside the RRU greatly increases costs and power consumption of the RRU. Therefore, in an existing solution, an external CPU and an external butler are usually disposed outside each RRU (outside a chip). In a current distributed Wi-Fi architecture, a maximum buffer capability of the RRU is designed, so as to ensure buffering of data when the RRU is connected to a maximum quantity of users. In this way, each RRU needs at least an external buffer of more than 128 MB to complete buffering of all data of a STA.

In the current distributed Wi-Fi architecture, utilization of quality of service (quality of service, QoS) resources such as the CPU and the buffer on the RRU is low. In actual application, due to reasons such as air interface channel quality and a listening and contention mechanism of the Wi-Fi technology, an air interface throughput is usually about 10%, and QoS resource utilization is usually only 10% to 20%, resulting in a QoS resource waste. To save QoS resources, a hardware structure of the distributed Wi-Fi architecture may be modified. However, an existing data transmission process is inevitably not applicable to a modified distributed Wi-Fi architecture.

SUMMARY

This application provides a data transmission method, a device, and a wireless network system, so as to save QoS resources and reduce architecture costs on the premise of implementing reordering during uplink data transmission.

According to a first aspect, a data transmission method is provided. The method is applied to a wireless network, the wireless network includes a central device and at least one remote device, and the method includes: receiving, by the central device, at least one first data packet sent by a first remote device in the at least one remote device, where the first data packet includes sequence number information, and the sequence number information is used to indicate a relative location that is of a payload in the first data packet and that is in a to-be-transmitted second data packet; reordering, by the central device, the at least one first data packet based on the sequence number information, to obtain the second data packet; and sending, by the central device, the second data packet.

According to the data transmission method in the first aspect, the central device receives the first data packet that is sent by the remote device and that includes the sequence number information, and reorders the first data packet based on the sequence number information, to obtain and send the second data packet, so that at least a part of reordering is performed by the central device. In this way, QoS resources can be shifted up to the central device on the premise that uplink data transmission is ensured, thereby saving QoS resources and reducing architecture costs.

In a possible implementation of the first aspect the first data packet further includes a user identifier (user identity, user ID) and a traffic identifier (traffic identifier, TID), the first remote device is configured to serve first user equipment, the user identifier is used to indicate the first user equipment, and the traffic identifier is used to indicate a traffic type corresponding to the first data packet; and the reordering, by the central device, the at least one first data packet based on the sequence number information, to obtain the second data packet includes: reordering, by the central device, the at least one first data packet based on the user identifier, the traffic identifier, and the sequence number information, to obtain the second data packet of the traffic type of the first user equipment. The central device may simultaneously process data of a plurality of user equipments and/or a plurality of traffic types. In this implementation, the first data packet carries the user ID and the TID, so that the central device can distinguish the user equipment and the traffic type that correspond to the data packet, and packetize data of a same traffic type of same user equipment into the second data packet.

In a possible implementation of the first aspect, the sequence number information is used to indicate a relative location that is of a payload of one or more physical layer convergence protocol PLCP service data units PSDUs in the first data packet and that is in the second data packet. In this implementation, the payload of the first data packet received by the central device may use a PSDU as a minimum unit of a sequence number. The minimum unit is consistent with a unit of a third data packet received by the remote device, thereby facilitating processing by the remote device. In this case, the remote device may be disposed with a very small internal buffer (buffer). The remote device uploads a data packet upon receiving the data packet, and reordering is not performed by the remote device but is performed only by the central device. This can ensure normal uplink data transmission.

In a possible implementation of the first aspect, the first data packet includes a payload of at least one physical layer convergence protocol PLCP service data unit PSDU. In this implementation, the payload of the first data packet received by the central device may use a PSDU as a minimum processing unit. The minimum processing unit is consistent with a unit of a third data packet received by the remote device, thereby facilitating processing by the remote device.

In a possible implementation of the first aspect, the sequence number information is used to indicate a relative location that is of a payload of an MPDU in the first data packet and that is in the second data packet. In this implementation, the payload of the first data packet received by the central device may use an MPDU as a minimum unit of a sequence number. In this case, the remote device performs appropriate reordering on payloads of the received third data packet, and the remote device may use an idle internal buffer, so that processing load of the central device can be reduced.

In a possible implementation of the first aspect, the first data packet includes a payload of at least one media access control MAC layer protocol data unit MPDU. The remote device may perform appropriate reordering on payloads of the received third data packet, and may use an idle internal buffer, so that processing load of the central device can be reduced.

In a possible implementation of the first aspect, the first data packet further includes an output indication flush field, and the flush field is used to carry information that is used to instruct the central device to send the buffered second data packet. In this implementation, a flush mechanism is designed, so that when an incorrect third data packet expires, the central device no longer waits for subsequent data after receiving a flush message, but reorders existing data, and sends the reordered data to an upper-level device. The flush mechanism enables the central device to release QoS resources under a specific condition, thereby increasing QoS resource utilization.

According to a second aspect, a data transmission method is provided. The method is applied to a wireless network, the wireless network includes a central device and at least one remote device, and the method includes: receiving, by the central device, at least one first data packet sent by a first remote device in the at least one remote device, where the first data packet includes a user identifier user ID and a traffic identifier TID, the first remote device is configured to serve first user equipment, the user identifier is used to indicate the first user equipment, and the traffic identifier is used to indicate a traffic type corresponding to the first data packet; reordering, by the central device, the at least one first data packet based on the user identifier and the traffic identifier, to obtain a second data packet; and sending, by the central device, the second data packet.

According to the data transmission method in the second aspect, the central device receives the first data packet that is sent by the remote device and that includes the user identifier and the traffic identifier of the user equipment, and reorders the first data packet based on the user identifier and the traffic identifier, to obtain and send the second data packet, so that at least a part of reordering is performed by the central device. In this way, QoS resources can be shifted up to the central device on the premise that uplink data transmission is ensured, thereby saving QoS resources and reducing architecture costs.

In a possible implementation of the second aspect, the first data packet further includes sequence number information, and the sequence number information is used to indicate a relative location that is of a payload in the first data packet and that is in the second data packet; and the reordering, by the central device, the at least one first data packet based on the user identifier and the traffic identifier includes: reordering, by the central device, the at least one first data packet based on the user identifier, the traffic identifier, and the sequence number information. The payload of the first data packet received by the central device may be out of order. In this implementation, the sequence number information used to indicate the relative location of the payload in the first data packet is carried in the first data packet, and the central device performs reordering based on the sequence number information.

Some possible implementations of the second aspect are similar to some possible implementations of the first aspect, and the implementations are not described in detail one by one herein.

According to a third aspect, a data transmission method is provided. The method is applied to a wireless network, the wireless network includes a central device and at least one remote device, and the method includes: receiving, by the remote device, at least one third data packet sent by first user equipment, where the remote device is configured to serve the first user equipment; and sending, by the remote device, at least one first data packet to the central device, where the first data packet includes some or all payloads of the at least one third data packet, the first data packet includes sequence number information, and the sequence number information is used to indicate a relative location that is of a payload in the first data packet and that is in a second data packet to be transmitted by the central device, so that the central device reorders the at least one first data packet based on the sequence number information.

According to the data transmission method in the third aspect, after receiving the third data packet sent by the user equipment, the remote device sends the first data packet including the third data packet to the central device, where the first data packet carries the sequence number information of the user equipment, so that the central device reorders the received first data packet based on the sequence number information, and at least a part of reordering is performed by the central device. In this way, QoS resources can be shifted up to the central device on the premise that uplink data transmission is ensured, thereby saving QoS resources and reducing architecture costs.

In a possible implementation of the third aspect, the first data packet further includes a user identifier user ID and a traffic identifier TID, the user identifier is used to indicate the first user equipment, and the traffic identifier is used to indicate a traffic type corresponding to the first data packet.

In a possible implementation of the third aspect, the sequence number information is used to indicate a relative location that is of a payload of one or more physical layer convergence protocol PLCP service data units PSDUs in the first data packet and that is in the second data packet.

In a possible implementation of the third aspect, before the sending, by the remote device, at least one first data packet to the central device, the method further includes: encapsulating, by the remote device, the some or all payloads of the at least one third data packet into the first data packet. In this implementation, the remote device may be disposed with a very small internal buffer. The remote device uploads a data packet upon receiving the data packet, and reordering is not performed by the remote device but is performed only by the central device. This can ensure normal uplink data transmission.

In a possible implementation of the third aspect, the encapsulating, by the remote device, the some or all payloads of the at least one third data packet into the first data packet includes: encapsulating, by the remote device, the some or all payloads of the at least one third data packet into the first data packet after reordering the some or all payloads of the at least one third data packet.

In a possible implementation of the third aspect, the first data packet includes a payload of at least one physical layer convergence protocol PLCP service data unit PSDU.

In a possible implementation of the third aspect, the first data packet includes a payload of at least one media access control MAC layer protocol data unit MPDU. In this implementation, the remote device performs appropriate reordering on the payloads of the received third data packet, and the remote device may use an idle internal buffer, so that processing load of the central device can be reduced.

In a possible implementation of the third aspect, before the sending, by the remote device, at least one first data packet to the central device, the method further includes: when a buffer margin of the remote device is greater than a first preset threshold, encapsulating, by the remote device, the some or all payloads of the at least one third data packet into the first data packet after reordering the some or all payloads of the at least one third data packet, where the first data packet includes a payload of at least one media access control MAC layer protocol data unit MPDU; or when a buffer margin of the remote device is less than or equal to a first preset threshold, encapsulating, by the remote device, the some or all payloads of the at least one third data packet into the first data packet, where the first data packet includes a payload of at least one physical layer convergence protocol PLCP service data unit PSDU. In this implementation, the remote device determines usage of the internal buffer of the remote device, and chooses, based on the usage, to reorder or not to reorder payloads of a plurality of third data packets. In this way, QoS resources of the remote device can be fully used, and QoS resources can be saved to a greater extent.

In a possible implementation of the third aspect, the first data packet further includes an output indication flush field, and the flush field is used to carry information that is used to instruct the central device to send the buffered second data packet.

According to a fourth aspect, a data transmission method is provided. The method is applied to a wireless network, the wireless network includes a central device and at least one remote device, and the method includes: receiving, by the remote device, at least one third data packet sent by first user equipment; and sending, by the remote device, at least one first data packet to the central device, where the first data packet includes some or all payloads of the at least one third data packet, the first data packet includes a user identifier user ID and a traffic identifier TID, the remote device is configured to serve the first user equipment, the user identifier is used to indicate the first user equipment, and the traffic identifier is used to indicate a traffic type corresponding to the first data packet.

According to the data transmission method in the fourth aspect, after receiving the third data packet sent by the user equipment, the remote device sends the first data packet including the third data packet to the central device, where the first data packet carries the user identifier and the traffic identifier of the user equipment, so that the central device reorders the received first data packet based on the user identifier and the traffic identifier, and at least a part of reordering is performed by the central device. In this way, QoS resources can be shifted up to the central device on the premise that uplink data transmission is ensured, thereby saving QoS resources and reducing architecture costs.

In a possible implementation of the fourth aspect, the first data packet further includes sequence number information, and the sequence number information is used to indicate a relative location that is of a payload in the first data packet and that is in a second data packet to be transmitted by the central device, so that the central device reorders the at least one first data packet based on the user identifier and the sequence number information.

Some possible implementations of the fourth aspect are similar to some possible implementations of the third aspect, and the implementations are not described in detail one by one herein.

In a possible implementation of the first aspect to the fourth aspect, the third data packet is an 802.11 data packet.

In a possible implementation of the first aspect to the fourth aspect, the second data packet is an 802.3 data packet.

It should be understood that reordering performed by the remote device may be reordering in a unit of one MPDU, that is, reordering in the MPDU.

It should be understood that reordering performed by the remote device may be reordering in a unit of a plurality of MPDUs (for example, N MPDUs).

It should be understood that the central device completes reordering of uplink data to be sent on a channel obtained by the user equipment through contention once.

According to a fifth aspect, a data transmission method is provided. The method is applied to a wireless network, the wireless network includes a central device and at least one remote device, and the method includes: receiving, by the central device, a data request message sent by the remote device, where the data request message includes information used to indicate an amount of data requested by the remote device; and sending, by the central device, a data packet to the remote device based on the data request message.

According to the data transmission method in the fifth aspect, the central device receives the data request message sent by the remote device, where the data request message includes the information used to indicate the amount of the data requested by the remote device; and the central device sends the data packet to the remote device based on the information. In this way, when downlink data is transmitted, data does not overflow, and QoS resources of the remote device can be fully used, to be specific, some QoS resources can be shifted up to the central device on the premise that downlink data transmission is ensured, thereby saving QoS resources and reducing architecture costs.

In a possible implementation of the fifth aspect, the data packet includes a user identifier user ID and a traffic identifier TID, the user identifier is used to indicate user equipment to which the data packet belongs, and the traffic identifier is used to indicate a traffic type corresponding to the data packet. In this implementation, the remote device can send the data packet of the corresponding traffic type to the corresponding user equipment based on the user identifier and the traffic identifier.

According to a sixth aspect, a data transmission method is provided. The method is applied to a wireless network, the wireless network includes a central device and at least one remote device, and the method includes: sending, by the remote device, a data request message to the central device. Where the data request message includes information used to indicate an amount of data requested by the remote device; receiving, by the remote device, a data packet sent by the central device; and sending, by the remote device, data in the data packet to user equipment.

According to the data transmission method in the sixth aspect, the remote device sends the data request message to the central device, where the data request message includes the information used to indicate the amount of the data requested by the remote device; the central device sends a corresponding quantity of data packets to the remote device; and the remote device forwards data in the data packets. In this way, when downlink data is transmitted, data does not overflow, and QoS resources of the remote device can be fully used, to be specific, some QoS resources can be shifted up to the central device on the premise that downlink data transmission is ensured, thereby saving QoS resources and reducing architecture costs.

In a possible implementation of the sixth aspect, the data packet includes a user identifier user ID and a traffic identifier TID, the user identifier is used to indicate user equipment to which the data packet belongs, and the traffic identifier is used to indicate a traffic type corresponding to the data packet. In this implementation, the remote device can send the data packet of the corresponding traffic type to the corresponding user equipment based on the user identifier and the traffic identifier.

In a possible implementation of the sixth aspect, the sending, by the remote device, a data request message to the central device includes: sending, by the remote device, the data request message to the central device when a buffer margin of the remote device is greater than a second preset threshold. In this implementation, the remote device requests data based on usage of an internal buffer of the remote device, to avoid data overflow or a QoS resource waste of the remote device.

In a possible implementation of the sixth aspect, the sending, by the remote device, data in the data packet to user equipment includes: converting, by the remote device, the data packet into a media access control MAC layer protocol data unit MPDU; and sending, by the remote device, the MPDU to the user equipment.

In a possible implementation of the fifth aspect and the sixth aspect, the information used to indicate the amount of the data requested by the remote device includes information about the buffer margin of the remote device.

In a possible implementation of the fifth aspect and the sixth aspect, the information used to indicate the amount of the data requested by the remote device includes a maximum quantity of scheduled media access control MAC layer service data units MSDUs and/or a maximum quantity of scheduled bytes.

In a possible implementation of the fifth aspect to the sixth aspect, the data packet is an 802.3 data packet.

According to a seventh aspect, this application provides a central device, configured to perform the method in the first aspect, the second aspect, the fifth aspect, or any possible implementation of the first aspect, the second aspect, or the fifth aspect. Specifically, the transmission device may include a module configured to perform the method in the first aspect, the second aspect, the fifth aspect, or any possible implementation of the first aspect, the second aspect, or the fifth aspect.

According to an eighth aspect, this application provides a remote device, configured to perform the method in the third aspect, the fourth aspect, the sixth aspect, or any possible implementation of the third aspect, the fourth aspect, or the sixth aspect. Specifically, the transmission device may include a module configured to perform the method in the third aspect, the fourth aspect, the sixth aspect, or any possible implementation of the third aspect, the fourth aspect, or the sixth aspect.

According to a ninth aspect, this application provides a central device, where the central device includes a processor and a memory, the memory is configured to store an instruction, and the processor is configured to execute the instruction stored in the memory, so that the central device performs the method in the first aspect, the second aspect, the fifth aspect, or any possible implementation of the first aspect, the second aspect, or the fifth aspect.

According to a tenth aspect, this application provides a remote device, where the remote device includes a processor and a memory, the memory is configured to store an instruction, and the processor is configured to execute the instruction stored in the memory, so that the remote device performs the method in the third aspect, the fourth aspect, the sixth aspect, or any possible implementation of the third aspect, the fourth aspect, or the sixth aspect.

According to an eleventh aspect, this application provides a computer storage medium. The computer storage medium stores an instruction, and when the instruction is run on a computer, the computer is enabled to perform the method in the first aspect, the second aspect, the fifth aspect, or any possible implementation of the first aspect, the second aspect, or the fifth aspect.

According to a twelfth aspect, this application provides a computer storage medium. The computer storage medium stores an instruction, and when the instruction is run on a computer, the computer is enabled to perform the method in the third aspect, the fourth aspect, the sixth aspect, or any possible implementation of the third aspect, the fourth aspect, or the sixth aspect.

According to a thirteenth aspect, this application provides a computer program product including an instruction. When a computer runs the instruction of the computer program product, the computer performs the method in the first aspect, the second aspect, the fifth aspect, or any possible implementation of the first aspect, the second aspect, or the fifth aspect.

According to a fourteenth aspect, this application provides a computer program product including an instruction. When a computer runs the instruction of the computer program product, the computer performs the method in the third aspect, the fourth aspect, the sixth aspect, or any possible implementation of the third aspect, the fourth aspect, or the sixth aspect.

According to a fifteenth aspect, an embodiment of this application provides a wireless network system, including any one of the foregoing possible central devices and at least one of the foregoing possible remote devices.

Effects that can be achieved in the seventh aspect to the fifteenth aspect correspond to effects that can be achieved in the first aspect to the sixth aspect. Effects are not described in detail one by one herein.

It should be understood that, in the aspects of this application and the corresponding implementations, no external buffer is disposed on the remote device, and an external buffer is disposed on the central device.

In the aspects of this application and the corresponding implementations, it may be understood that the sequence number information indicates the relative location that is of the payload in the first data packet and that is in the second data packet; or it may be understood that the sequence number information indicates a relative location that is of the first data packet and that is in a data stream; or it may be understood that the sequence number information indicates a relative location that is of the payload in the first data packet and that is in a data stream; or it may be understood that the sequence number information indicates a relative location that is of the payload in the first data packet and that is in a data stream sent by the user equipment. The relative location that is of the payload in the first data packet and that is in the second data packet, the relative location that is of the first data packet and that is in the data stream, the relative location that is of the payload in the first data packet and that is in the data stream, and the relative location that is of the payload in the first data packet and that is in the data stream sent by the user equipment are consistent.

DESCRIPTION OF EMBODIMENTS

Figure 1:
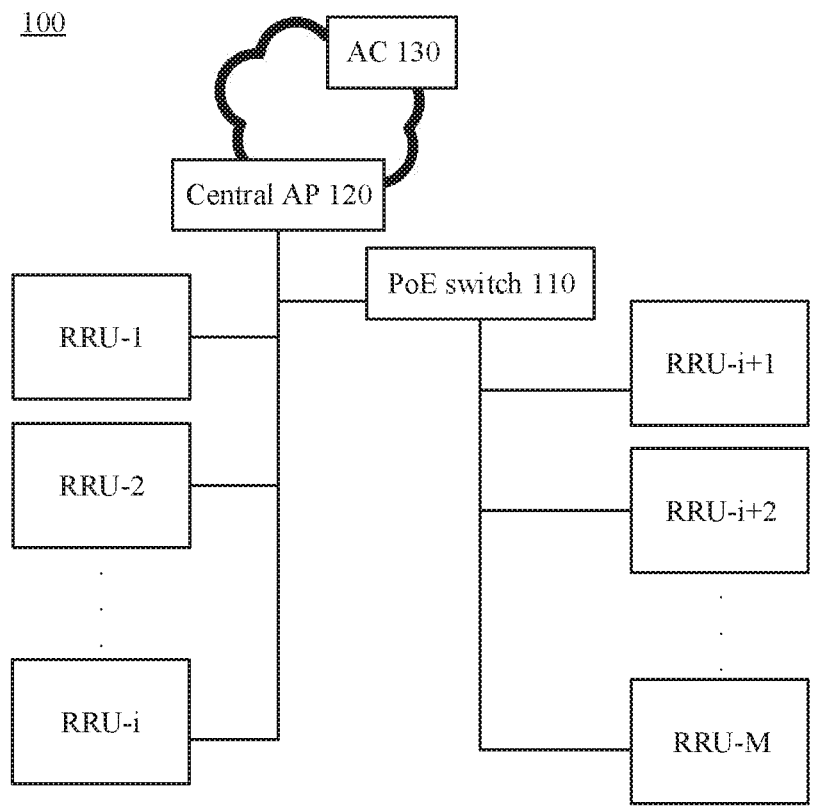
FIG. 1 is a schematic networking diagram of a distributed Wi-Fi architecture to which an embodiment of this application is applied.

The following describes technical solutions of this application with reference to the accompanying drawings.

A wireless network in embodiments of this application may be a WLAN, or may be a centralized radio access network (centralized ran, C-RAN), or may be another network. A central device in the embodiments of this application may be a central AP in a distributed architecture, may be a building baseband unit (building base band unit, BBU) in a C-RAN architecture, or may be a central device in a distributed architecture of another network, A remote device in the embodiments of this application may be an RRU or an RU in a distributed Wi-Fi architecture, may be a remote radio unit (remote radio unit, RRU) in a C-RAN architecture, or may be a remote device in a distributed architecture of another network. Specific forms of the wireless network, the central device, and the remote device are not limited in the embodiments of this application. The WLAN is used as an example for detailed description in this specification.

Reordering (reorder) is involved in some embodiments of this application. In the WLAN, reordering is understood as follows: In the distributed Wi-Fi architecture, a STA sends uplink data to a central AP by using an RRU in a specific order. The uplink data may be interfered with in an air interface transmission process, and consequently, a data packet in the uplink data is incorrect. In this case, the STA retransmits the incorrect data packet, and after receiving the correct data packet, the RRU or the central AP reorders all data packets in the uplink data. Alternatively, reordering refers to ordering data on the RRU or an upper-level device of the RRU. For example, the uplink data is processed in a unit of a MAC protocol data unit (medium access control (MAC) protocol data unit, MPDU). The STA transmits a plurality of MPDUs (for example, an MPDU 1, an MPDU 2, an MPDU 3, and an MPDU 4, where the MPDU may be further divided into a plurality of segments of data) to the central AP once by using the RRU. The plurality of MPDUs may be interfered with in an air interface transmission process, and consequently, for example, the MPDU 1 is incorrect. In this case, the STA retransmits the incorrect MPDU 1, and at the same time, the RRU or the central AP buffers the MPDU 2, the MPDU 3, and the MPDU 4. After receiving the correct MPDU 1, the RRU or the central AP reorders the MPDU 1, the MPDU 2, the MPDU 3, and the MPDU 4, and then transmits the MPDU 1, the MPDU 2, the MPDU 3, and the MPDU 4 to the upper-level device.

A user identifier (user identity, user ID) in the embodiments of this application includes user information that is of a non-AP STA and that is used for a network service. The user ID is provided by the non-AP STA in a process of establishing a robust security network association (robust security network association, RSNA) for an authentication, authorization, and accounting (authentication, authorization, and accounting AAA) server. The user ID includes an identifier and security specific provider security specific providers, SSP) information of a user.

A traffic identifier (traffic identifier, TID) in the embodiments of this application is an identifier that may be used by a higher layer entity to allocate an MSDU to a MAC entity, to support a MAC data service of QoS. The traffic identifier has 16 possible TID values. At a MAC layer, the TID is allocated to the MSDU.

FIG. 1 is a schematic networking diagram of a distributed Wi-Fi architecture 100 to which an embodiment of this application is applied. FIG. 1 shows M RRUs, including an RRU-1, an RRU-2, . . . , an RRU-i, an RRU-i+1, an RRU-i+2, . . . , and an RRU-M. M is a positive integer greater than or equal to 1. Usually, M may be 24, 48, or greater than 48. This is not limited in this embodiment of this application. The M RRUs may be connected to a central AP 120 upwards by using a power over Ethernet (power over ethernet, PoE) switch 110, or the M RRUs may be directly connected to a central AP 120. The central AP 120 may be disposed with M (for example, 24 or 48) network ports to connect to the M RRUs. The central AP 120 accesses a WLAN under management of an access controller (access controller, AC) 130. This networking structure may be applied, for example, to a hotel, each RRU may be placed in a room of the hotel, and the central AP 120 and the AC 130 may be placed in a network operation and maintenance center of the hotel.

Figure 2:
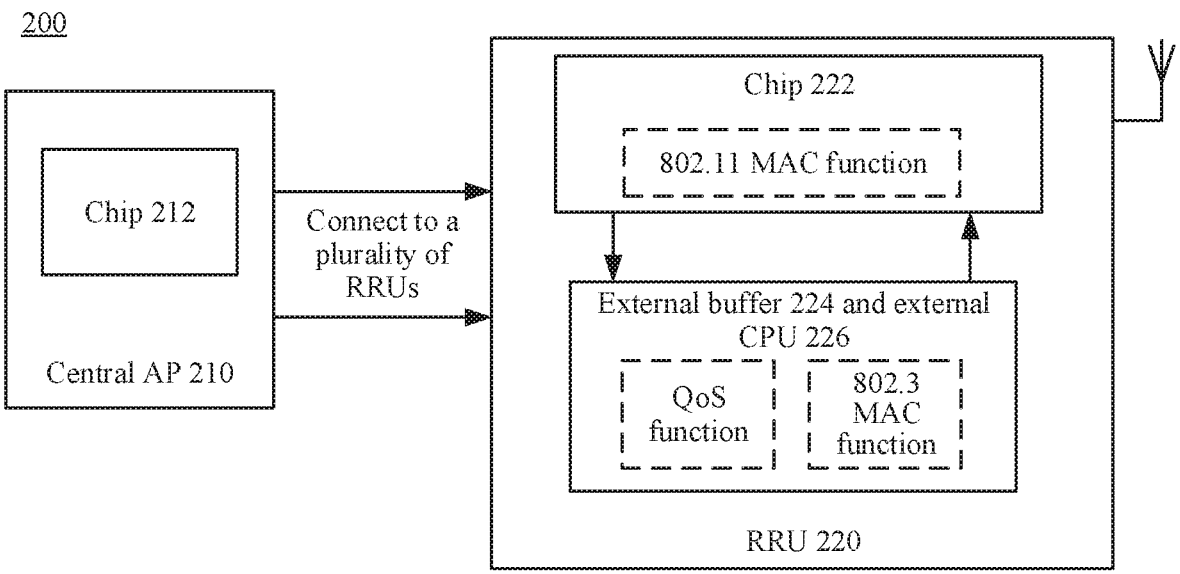
FIG. 2 is a schematic diagram of an existing hardware structure of a central AP and an existing hardware structure of an RRU.

FIG. 2 is a schematic diagram of an existing hardware structure 200 of a central AP and an RRU. As shown in FIG. 2, a chip 212 is disposed in a central AP 210, and an internal CPU and an internal buffer (for example, the internal buffer may be a double data rate synchronous dynamic random access memory (double data rate synchronous dynamic random access memory, DDR SDRAM)) are disposed on the chip 212. A plurality of RRUs may be connected to the central AP 210, where the plurality of RRUs include an RRU 220. A chip 222 is disposed in the RRU 220, and an internal CPU and an internal buffer (for example, a DDR SDRAM) are disposed on the chip 222. The chip 222 is configured to complete an 802.11 media access control (media access control, MAC) function. An external buffer 224 is disposed outside the chip 222. Optionally, an external CPU 226 may be further disposed outside the chip 222. The external buffer and the external CPU are configured to complete a QoS function, an 802.3 MAC function, and the like, for example, to reorder and encapsulate uplink data during uplink transmission, and parse and schedule downlink data during downlink transmission.

Figure 3:
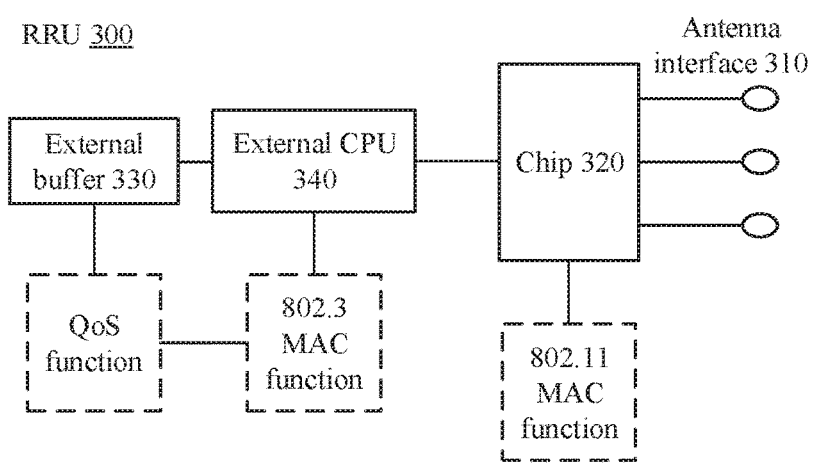
FIG. 3 is a schematic diagram of an existing hardware structure of an RRU.

FIG. 3 is a schematic diagram of an existing hardware structure of an RRU 300. As shown in FIG. 3, the RRU 300 includes at least one antenna interface 310, configured to send and receive uplink data and downlink data. The RRU 300 includes a chip 320, configured to implement an 802.11 MAC function. Outside the chip 320, the RRU 300 further includes an external buffer (buffer) 330 and an external CPU 340 that are configured to complete a QoS function and an 802.3 MAC function.

In an existing hardware structure of a central AP and an existing hardware structure of an RRU, an external buffer and an external CPU are disposed for each RRU, and utilization of these QoS resources is usually only 10% to 20%, resulting in a QoS resource waste. To save QoS resources, in this embodiment of this application, an external buffer (or an external buffer and an external CPU) is shifted up to the central AP, and a plurality of RRUs connected to the central AP may share the external buffer (or the external buffer and the external CPU), so that a QoS resource configuration requirement can be reduced.

Figure 4:
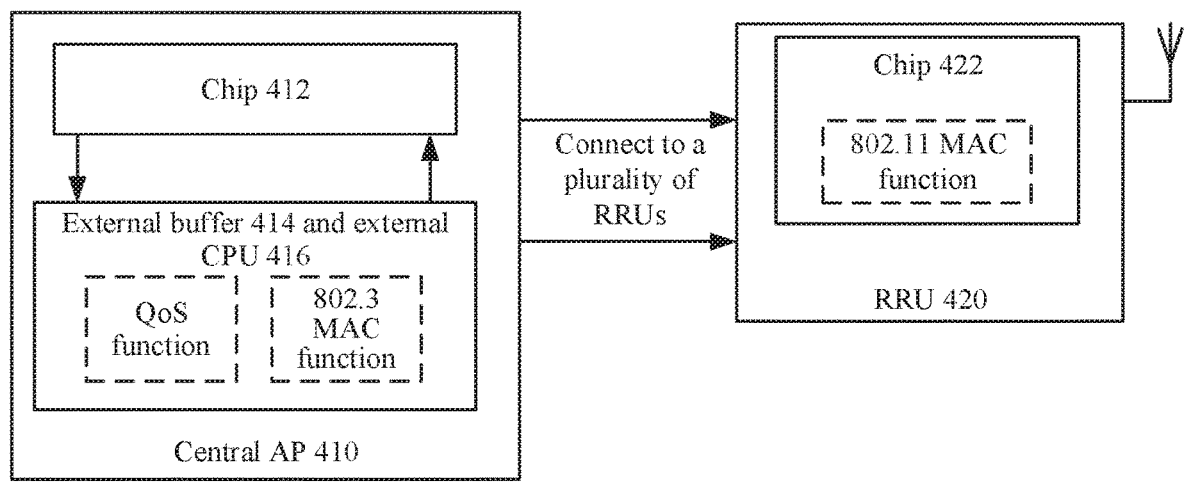
FIG. 4 is a schematic diagram of a hardware structure of a central AP and a hardware structure of an RRU according to an embodiment of this application.

FIG. 4 is a schematic diagram of a hardware structure 400 of a central AP and an RRU according to an embodiment of this application. As shown in FIG. 4, a chip 412 is disposed in a central AP 410, and an internal CPU and an internal butler (for example, the internal buffer may be a DDR SDRAM) are disposed on the chip 412. An external buffer 414 is disposed outside the chip 412. Optionally, an external CPU 416 may be further disposed outside the chip 412. The external buffer and the external CPU are configured to complete all or a part of a QoS function and an 802.3 MAC function, for example, to reorder and encapsulate uplink data during uplink transmission, and parse and schedule downlink data during downlink transmission. A plurality of RRUs may be connected to the central AP 410, where the plurality of RRUs include an RRU 420. A chip 422 is disposed in the RRU 420, and an internal CPU and an internal buffer (for example, a DDR SDRAM) are disposed on the chip 422. The chip 422 is configured to complete an 802.11 MAC function, and may be further configured to complete a part of the QoS function.

Figure 5:
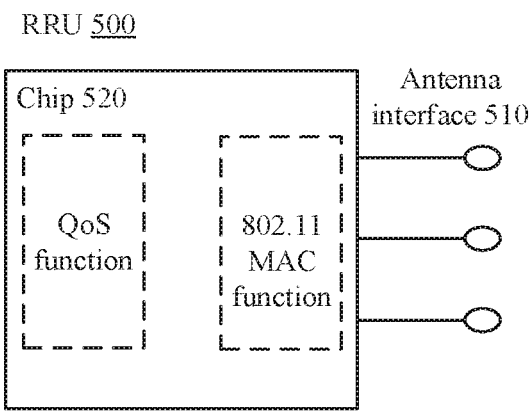
FIG. 5 is a schematic diagram of a hardware structure of an RRU according to an embodiment of this application.

FIG. 5 is a schematic diagram of a hardware structure of an RRU 500 according to an embodiment of this application. As shown in FIG. 5, in the embodiments of this application, because an external buffer (or an external buffer and an external CPU) of the RRU is shifted up to a central AP, the RRU no longer has a hardware condition for performing all of a QoS function. The RRU 500 includes at least one antenna interface 510, configured to send and receive uplink data and downlink data. The RRU includes a chip 520, configured to implement an 802.11 MAC function, and may further perform a part of the QoS function and send data to the central AP.

The hardware structures, shown in FIG. 4 and FIG. 5, of the central AP and the RRU cause a problem to data transmission. In the embodiments of this application, an external buffer (or an external buffer and an external CPU) of the RRU is shifted up to the central AP, and both an internal buffer for uplink and an internal buffer for downlink on the chip of the RRU are very small (usually within 30 MB). During uplink transmission, because the internal buffer is small, uplink data cannot be completely reordered on the RRU. During downlink transmission, because the internal buffer is small, downlink data may overflow.

An embodiment of this application provides a data transmission method. The method is applied to a wireless network, and the wireless network includes a central device and at least one remote device. The wireless network, the central device, and the remote device are specifically as described above.

Figure 6:
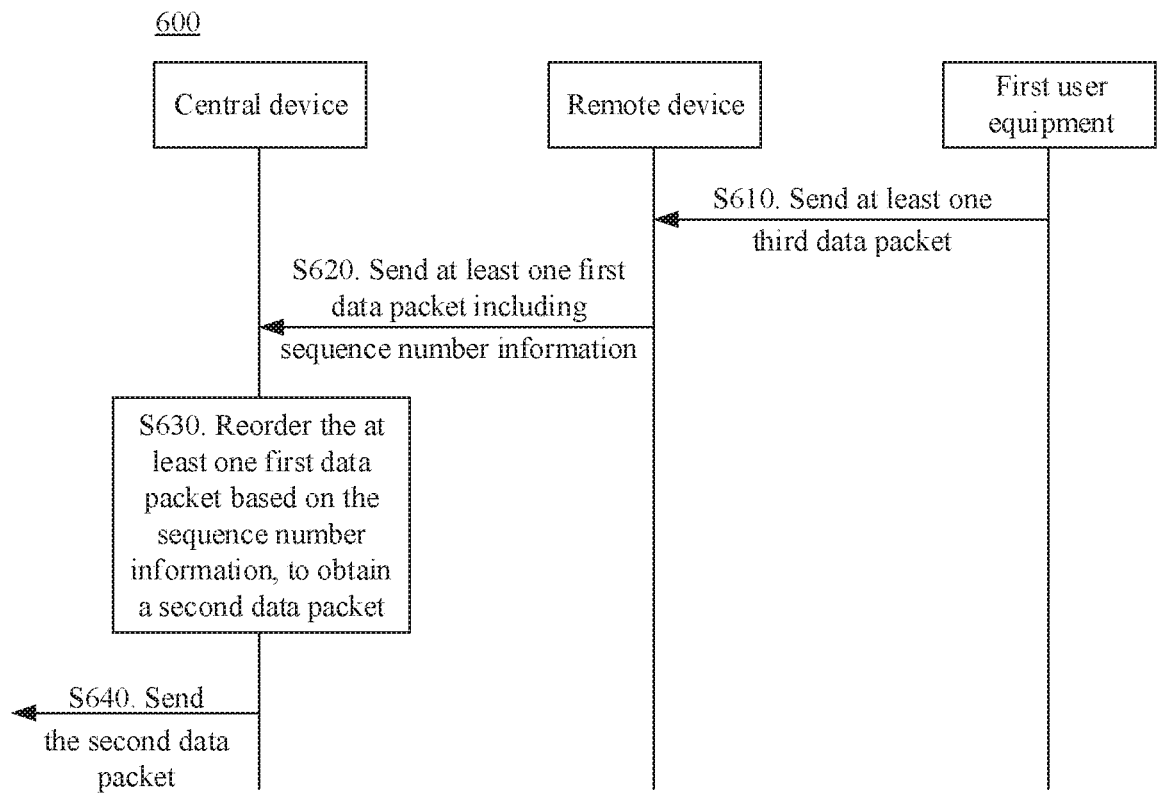
FIG. 6 is a schematic flowchart of a data transmission method according to an embodiment of this application.

FIG. 6 is a schematic flowchart of a data transmission method 600 according to an embodiment of this application. FIG. 6 shows an uplink data transmission method, and the method 600 may include the following steps.

S610. A remote device receives at least one third data packet (data package) sent by first user equipment. The remote device may be a first remote device in at least one remote device.

S620. The remote device sends at least one first data packet to a central device, where the first data packet includes some or all payloads of the at least one third data packet, the first data packet includes sequence number information, and the sequence number information is used to indicate a relative location that is of a payload in the first data packet and that is in a to-be-transmitted second data packet. Correspondingly, the central device receives the at least one first data packet sent by the remote device. It should be understood that the remote device may be any remote device in at least one remote device in a wireless network, for example, the remote device may be a first remote device.

S630. The central device reorders the at least one first data packet based on the sequence number information, to obtain the second data packet, where the sequence number information is used to indicate the relative location that is of the payload in the first data packet and that is in the second data packet.

S640. The central device sends the second data packet.

According to the data transmission method in this embodiment of this application, after receiving the third data packet sent by the user equipment, the remote device sends the first data packet including the third data packet to the central device, where the first data packet carries the sequence number information. The central device reorders the received first data packet based on the sequence number information, to obtain and send the second data packet. According to the method, at least a part of reordering is performed by the central device. In this way, QoS resources can be shifted up to the central device on the premise that uplink data transmission is ensured, thereby saving QoS resources and reducing architecture costs.

In a WLAN scenario, according to the data transmission method in this embodiment of this application, the first data packet carries the sequence number information, so that at least a part of reordering is performed by a central AP, thereby resolving a problem that an RRU cannot perform complete reordering. In this way, QoS resources can be shifted up to the central AP on the premise that uplink data transmission is ensured, thereby saving QoS resources and reducing architecture costs.

In this embodiment of this application, the first data packet includes the sequence number information, and the sequence number information is used to indicate the relative location that is of the payload in the first data packet and that is in the second data packet. In other words, it may be understood that the sequence number information indicates the relative location that is of the payload in the first data packet and that is in the second data packet; or it may be understood that the sequence number information indicates a relative location that is of the first data packet and that is in a data stream; or it may be understood that the sequence number information indicates a relative location that is of the payload in the first data packet and that is in a data stream sent by the user equipment. The relative location that is of the payload in the first data packet and that is in the second data packet, the relative location that is of the first data packet and that is in the data stream, a relative location that is of the payload in the first data packet and that is in the data stream, and the relative location that is of the payload in the first data packet and that is in the data stream sent by the user equipment are consistent.

Specifically, each third data packet may include a sequence number, an identifier, or an index that indicates a relative location that is of the third data packet and that is in the at least one third data packet. The remote device may reorder, based on the sequence number, the identifier, or the index in the third data packet, some third data packets in the at least one third data packet or payloads in some third data packets, and encapsulate the reordered some third data packets in the at least one third data packet or the reordered payloads in the sonic third data packets into the first data packet. Certainly, the remote device may alternatively encapsulate some third data packets in the at least one third data packet or payloads in some third data packets into the first data packet directly. The remote device may encapsulate, into a plurality of first data packets, payloads in all third data packets to be sent on a channel obtained by the user equipment through contention once. Interference may be caused in an air interface transmission process, and consequently, a third data packet is incorrect, and the third data packet needs to be retransmitted. In this case, the third data packet received by the remote device may be out of order. Consequently, the payload in the first data packet into which the third data packet is encapsulated and that is sent to the central device is out of order. Therefore, in this embodiment of this application, the sequence number information used to indicate the relative location of the payload in the first data packet is carried in the first data packet, so that the central device performs reordering.

The sequence number information in this embodiment of this application may be in various forms. For example, the form may be a sequence number, an identifier, or an index. Alternatively, the sequence number information may be in another form.

The sequence number information in this embodiment of this application may also have various content. For example, in a WLAN, the third data packet may be a physical layer convergence protocol (physical layer convergence protocol, PLCP) service data unit (service data unit), which is referred to as PSDU. In an optional solution, the first data packet may include a payload of at least one media access control (MAC) layer protocol data unit (protocol data unit), which is referred to as MPDU. The sequence number information in the first data packet may be used to indicate a relative location that is of a payload of one or more MPDUs in the first data packet and that is in the second data packet. In another optional solution, the first data packet includes a payload of at least one PSDU. A data unit in the first data packet may be the payload of the PSDU, and the sequence number information may be used to indicate a relative location that is of a payload of one or more PSDUs in the first data packet and that is in the second data packet. In still another optional solution, a data unit in the first data packet may be a part of a PSDU (for example, half of the PSDU), and the sequence number information may alternatively be a sequence number of one or more data units included in the MPDU. Alternatively, the sequence number information may be other content. This is not limited in this embodiment of this application.

Optionally, in an embodiment, the first data packet may further include a user identifier (user identity, user ID) and a traffic identifier (traffic identifier, TID), the first remote device is configured to serve the first user equipment, the user identifier is used to indicate the first user equipment, and the traffic identifier is used to indicate a traffic type corresponding to the first data packet; and that the central device reorders the at least one first data packet based on the sequence number information, to obtain the second data packet in S630 may include: reordering, by the central device, the at least one first data packet based on the user identifier, the traffic identifier, and the sequence number information, to obtain the second data packet of the traffic type of the first user equipment.

Specifically, during data transmission based on an existing hardware structure of a central AP and an existing hardware structure of an RRU, after receiving all 802.11 data packets to be sent on a channel obtained by a STA through contention once, the RRU reorders the 802.11 data packets to form 802.3 data packets, and sends the 802.3 data packets to the central AP; and the central AP directly sends the 802.3 data packets to an upstream device; where the 802.3 data packets do not include and do not need to include the user ID, the TID, and the like. In the method in this embodiment of this application, at least a part of reordering is performed by the central AP, the central AP serves a plurality of user equipments, and each user equipment may send data packets of a plurality of traffic types. The central device may buffer data packets of different traffic types of same user equipment in a period of time. Uplink data to be sent on a channel obtained by one user equipment through contention once needs to be sent to an upper-level device at a time, Therefore, the first data packet includes a user ID and a TID, so that the central device identifies user equipment to which a data packet belongs and a traffic type of the data packet, and then reorders and combines data packets of a same traffic type of same user equipment.

It should be understood that, in a WLAN scenario, to be better compatible with the prior art, the third data packet may be an 802.11 data packet, and the second data packet may be an 802.3 data packet. The first data packet may be a customized Ethernet data packet. Certainly, the first data packet to the third data packet may alternatively be data packets based on another protocol or technology. This is not limited in this embodiment of this application.

Optionally, the first data packet may further include an output indication (flush) field, and the flush field is used to carry information that is used to instruct the central device to send the buffered second data packet.

Specifically, the incorrect third data packet (for example, the PSDU) may not arrive (or the incorrect third data packet expires). Therefore, a flush mechanism is designed in this embodiment of this application. In the flush mechanism, after the incorrect third data packet expires, the remote device and the central device no longer wait, and the remote device notifies the central device by using the flush field of the first data packet to carry a flush message. After receiving the flush message, the central device no longer waits for subsequent data, but reorders existing data, and sends the reordered data to an upper-level device. The flush mechanism enables the central device to release QoS resources under a specific condition, thereby increasing QoS resource utilization.

Optionally, in this embodiment of this application, the information that is used to instruct the central device to send the buffered second data packet may be sent by using separate signaling rather than by using the first data packet. To be specific, the flush mechanism is started by using separate signaling. This is not limited in this embodiment of this application.

The method in this embodiment of this application may be based on first-level reordering, or may be based on second-level reordering. The first-level reordering means that data is not reordered on the remote device, but is reordered only by the central device. In a first-level reordering WLAN solution, the RRU may be disposed with a very small internal buffer, for example, a size of the buffer is only one MPDU (a maximum length of the MPDU is 2352 bytes) or even only one PSDU, The RRU uploads a data packet upon receiving the data packet, and reordering is not performed by the RRU but is performed only by the central AP. This can ensure normal uplink data transmission. The second-level reordering means that data is preliminarily reordered on the remote device and is sent after the central device completes reordering. In a second-level reordering WLAN solution, the RRU may perform appropriate reordering by using an idle internal buffer, so that processing load of the central AP can be reduced.

Optionally, before the remote device sends the at least one first data packet to the central device in S620, the method 600 may further include: encapsulating, by the remote device, the some or all payloads of the at least one third data packet into the first data packet. In an optional solution, the remote device does not reorder the payloads of the third data packet, to be specific, does not consider a sequence of the payloads of the third data packet. The remote device encapsulates the some or all payloads of the at least one third data packet into the first data packet directly. In another optional solution, the encapsulating, by the remote device, the some or all payloads of the at least one third data packet into the first data packet may include: encapsulating, by the remote device, the some or all payloads of the at least one third data packet into the first data packet after reordering the some or all payloads of the at least one third data packet. To be specific, the remote device reorders payloads of a plurality of third data packets within a capability range of an internal buffer of the remote device, and then encapsulates the reordered payloads into the first data packet. In this way, QoS resources of the remote device can be fully used, and reordering load of the central device can be reduced.

Optionally, before the remote device sends the at least one first data packet to the central device in S620, the method 600 may further include: when a buffer margin of the remote device is greater than a first preset threshold, encapsulating, by the remote device, the some or all payloads of the at least one third data packet into the first data packet after reordering the some or all payloads of the at least one third data packet, where the first data packet includes a payload of at least one MPDU; or when a buffer margin of the remote device is less than or equal to a first preset threshold, encapsulating, by the remote device, the some or all payloads of the at least one third data packet into the first data packet, where the first data packet includes a payload of at least one PSDU.

Specifically, based on a specific data transmission status and a size of a buffer (an internal buffer used for uplink) of the remote device, a system may preset the first preset threshold as a criterion for the remote device to determine whether to perform reordering. When the buffer margin of the remote device is greater than the first preset threshold, the remote device may perform first-level reordering on the payloads of the plurality of third data packets, and encapsulate the reordered payloads into the first data packet. For example, the third data packets are PSDUs, and the remote device may perform first-level reordering on payloads of a plurality of PSDUs (for example, the payloads of the plurality of PSDUs are equivalent to a payload of one or more MPDUs), and encapsulate the reordered payloads into the first data packet. When the buffer margin of the remote device is less than or equal to the first preset threshold, the remote device does not have an extra internal buffer to store the payloads of the plurality of third data packets. Therefore, the remote device cannot reorder the payloads of the plurality of third data packets, and the remote device encapsulates the payloads of the third data packets into the first data packet directly. For example, the third data packets are PSDUs, and the remote device may encapsulate payloads of the PSDUs into the first data packet. The remote device sends at least one first data packet to the central device; and the central device performs second-level reordering, and encapsulates the at least one first data packet into a second data packet, and sends the second data packet to the upper-level device. A relative location of a payload in the second data packet is consistent with a relative location of data sent by the STA. In this embodiment, the remote device determines usage of the internal buffer of the remote device, and chooses, based on the usage, to reorder or not to reorder the payloads of the plurality of third data packets. In this way, QoS resources of the remote device can be fully used, and QoS resources can be saved to a greater extent.

It should be understood that the buffer margin may be indicated by a remaining proportion of the internal buffer, or may be indicated by a remaining absolute value of the internal buffer. Certainly, the buffer margin may alternatively be indirectly indicated by a usage proportion of the internal butler or a usage absolute value of the internal buffer. This is not limited in this embodiment of this application.

This application further provides a data transmission method, and the method may include the following steps.

A remote device receives at least one third data packet sent by first user equipment. The remote device may be a first remote device in at least one remote device.

The remote device sends at least one first data packet to a central device, where the first data packet includes some or all payloads of the at least one third data packet, the first data packet includes a user ID and a TID, the remote device is configured to serve the first user equipment, the user identifier (user ID) is used to indicate the first user equipment, and the traffic identifier (TID) is used to indicate a traffic type corresponding to the first data packet. Correspondingly, the central device receives the at least one first data packet sent by the remote device. It should be understood that the remote device may be any remote device in at least one remote device in a wireless network, for example, the remote device may be a first remote device.

The central device reorders the at least one first data packet based on the user identifier and the traffic identifier, to obtain a second data packet. The central device sends the second data packet.

According to the data transmission method in this embodiment of this application, after receiving the third data packet sent by the user equipment, the remote device sends the first data packet including the third data packet to the central device, where the first data packet carries the user identifier and the traffic identifier of the user equipment. The central device reorders the received first data packet based on the user identifier and the traffic identifier, to obtain and send the second data packet. According to the method, at least a part of reordering is performed by the central device. In this way, QoS resources can be shifted up to the central device on the premise that uplink data transmission is ensured, thereby saving QoS resources and reducing architecture costs.

Optionally, the first data packet may further include sequence number information, and the sequence number information is used to indicate a relative location that is of a payload in the first data packet and that is in the second data packet. That the central device reorders the at least one first data packet based on the user identifier and the service identifier may include: reordering, by the central device, the at least one first data packet based on the user identifier, the traffic identifier, and the sequence number information.

The following describes the data transmission method in this embodiment of this application in detail with reference to a specific example.

Figure 7:
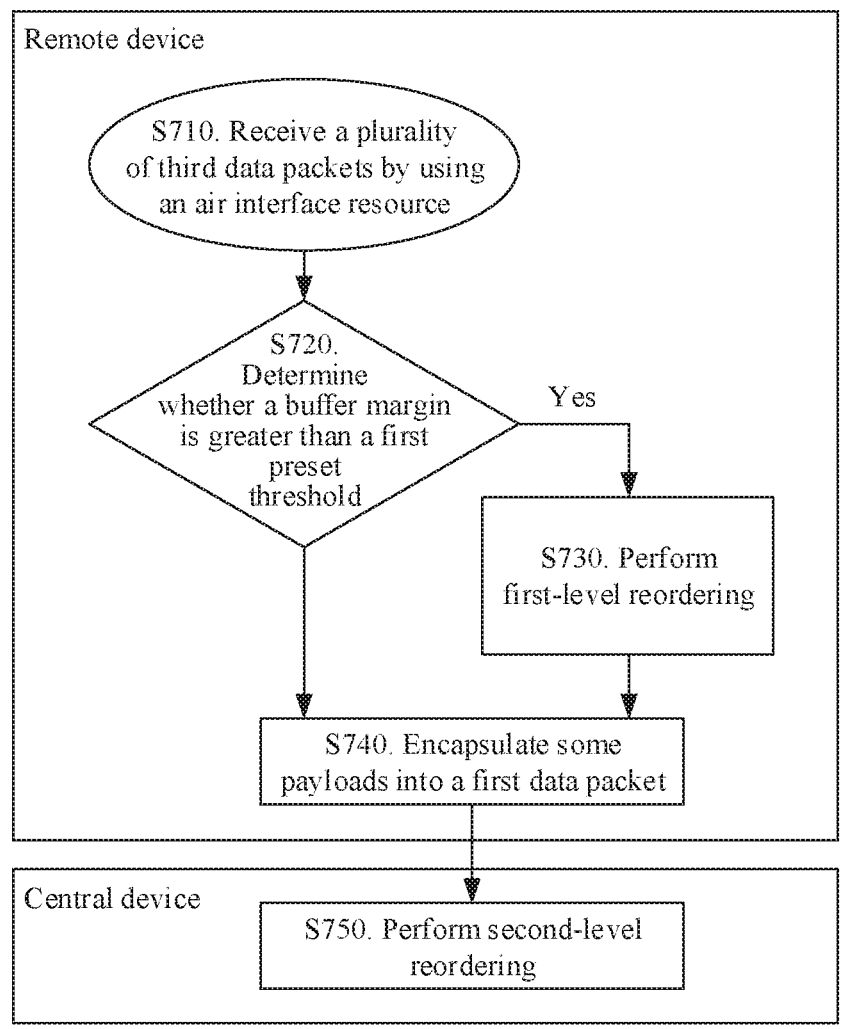
FIG. 7 is a schematic flowchart of a data transmission method according to an embodiment of this application.

FIG. 7 is a schematic flowchart of a data transmission method 700 according to an embodiment of this application. As shown in FIG. 7, the method 700 may include the following steps.

S710. Receive a plurality of third data packets by using an air interface resource. Specifically, a remote device receives, by using the air interface resource, the plurality of third data packets sent by first user equipment. The remote device parses the plurality of third data packets, and may collect a user ID, a TID, and the like.

S720: Determine whether a buffer margin is greater than a first preset threshold. Specifically, when determining that the buffer margin is greater than the first preset threshold, the remote device first performs S730 and then performs S740.

When determining that the buffer margin is less than or equal to the first preset threshold, the remote device directly performs S740.

S730. Perform first-level reordering. Specifically, there may be an incorrect third data packet received by the remote device in S710. If there is an incorrect third data packet, the remote device may keep the incorrect third data packet empty, and perform first-level reordering on some payloads in other received third data packets. If there is no incorrect third data packet, the remote device performs first-level reordering on some payloads in the plurality of received third data packets.

S740. Encapsulate the some payloads into a first data packet. Specifically, the remote device encapsulates the payloads on which first-level reordering is performed in S730 into a customized Ethernet data packet, that is, the first data packet. The first data packet includes sequence number information, and may further include the user ID and the TID. The remote device sends at least one first data packet to a central device.

S750. Perform second-level reordering. Specifically, the central device performs second-level reordering on the at least one first data packet based on the user ID, the TID, and the sequence number information. The central device encapsulates the at least one first packet on which second-level reordering is performed into a second packet, and sends the second packet to an upper-level device. If a flush mechanism is not executed, a payload in the second data packet includes all data payloads that need to be transmitted on a channel obtained by the user equipment through contention once.

Figure 8A:
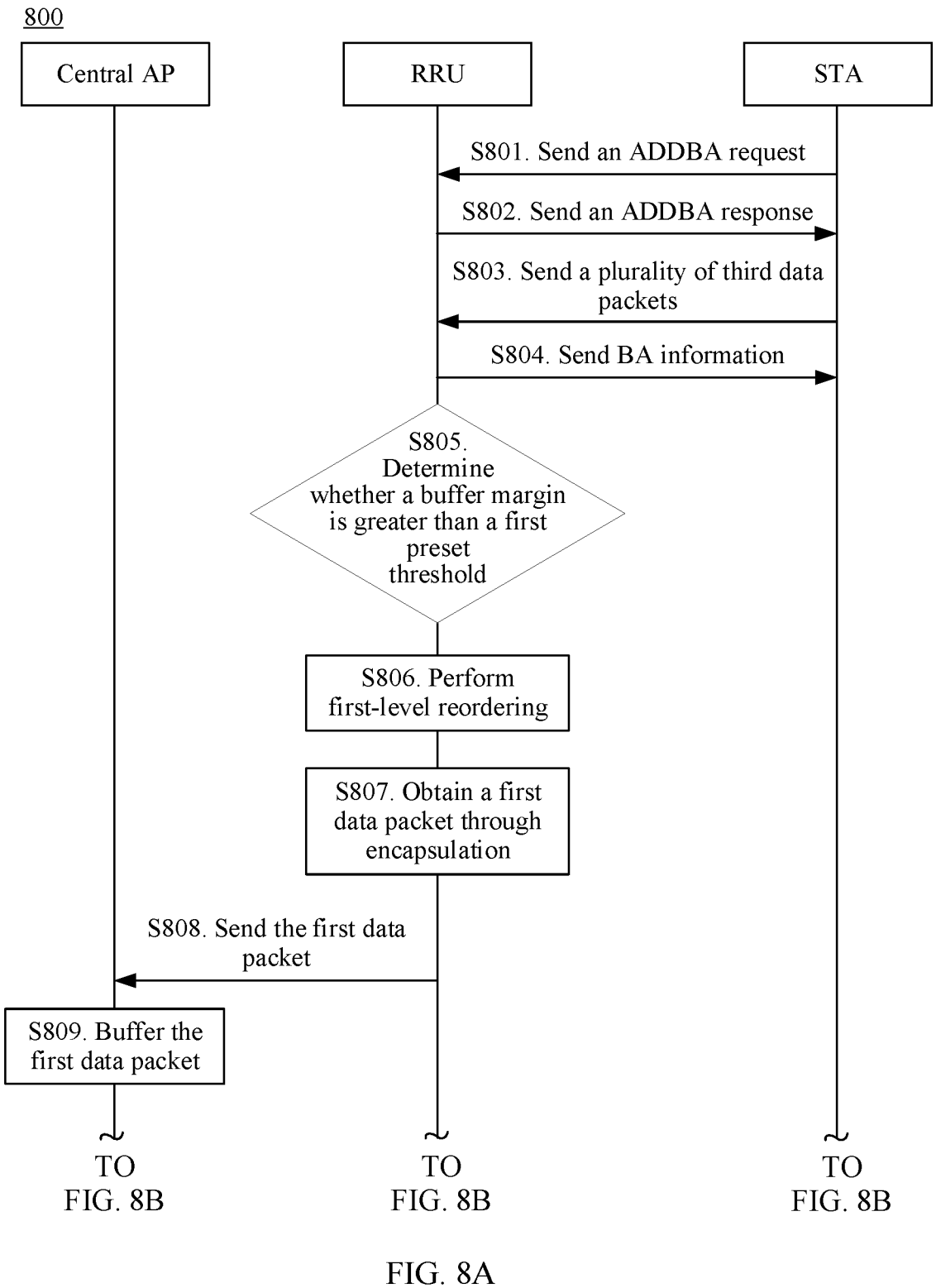
FIG. 8A and FIG. 8B are a schematic flowchart of a data transmission method according to an embodiment of this application.
Figure 8B:
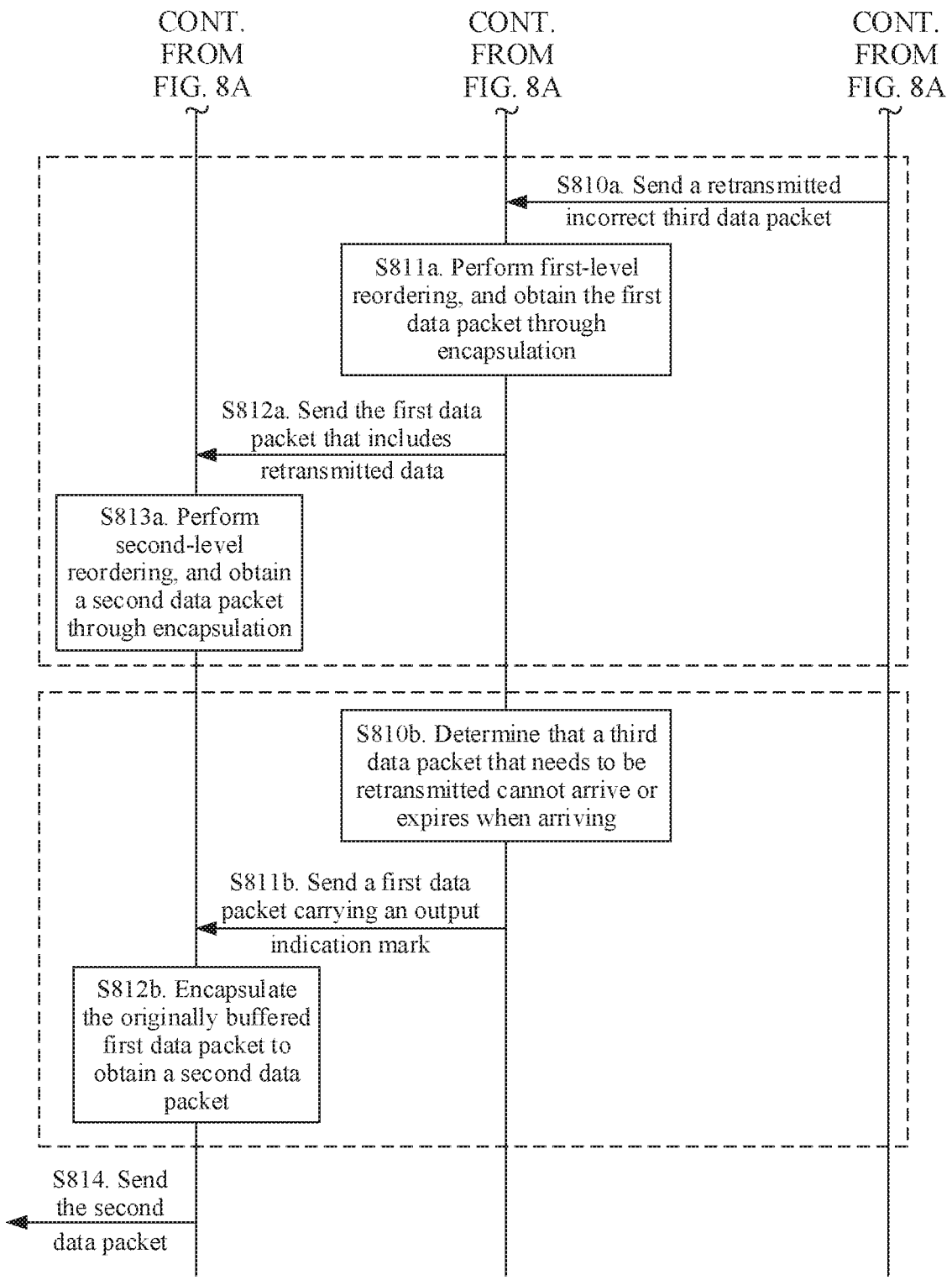

FIG. 8A and FIG. 8B are a schematic flowchart of a data transmission method 800 according to an embodiment of this application. As shown in FIG. 8A and FIG. 8B, the method 800 is applicable to a distributed Wi-Fi architecture, and the method 800 may include the following steps.

S801. A STA sends an add block acknowledgment (add block ack, ADDBA) request (request) to an RRU. Specifically, after the STA applies for and obtains an air interface resource, the STA sends the ADDBA request to the RRU, to notify the RRU of a length of data to be sent this time, a packet number of the data, and the like.

S802. The RRU sends an ADDBA response response) to the STA, where the ADDBA response includes acknowledgment (acknowledgement, ACK) information.

Figure 9:
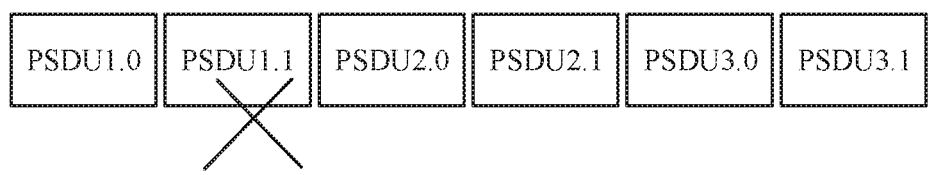
FIG. 9 is a schematic diagram of a plurality of third data packets according to an embodiment of this application.

S803. The STA sends a plurality of third data packets to the RRU. Specifically, for example, the STA sends a plurality of PSDUs to the RRU. As shown in FIG. 9, the plurality of third data packets may include a PSDU 1.0, a PSDU 1.1, a PSDU 2.0, a PSDU 2.1, a PSDU 3.0, and a PSDU 3.1. The PSDU 1.0 and the PSDU 1.1 belong to an MPDU 1, the PSDU 2.0 and the PSDU 2.1 belong to an MPDU 2, and the PSDU 3.0 and the PSDU 3.1 belong to an MPDU 3. A third data packet, for example, the PSDU 1.1, may collide, and an error may occur.

S804. The RRU sends block acknowledgment (Block ACK, BA) information to the STA. The BA information is used to require the STA to retransmit the incorrect third data packet, that is, the PSDU 1.1. Specifically, after receiving the plurality of PSDUs sent by the STA, the RRU performs a data cyclic redundancy check (cyclic redundancy check, CRC) at a MAC layer, and discards the incorrect PSDU 1.1. The RRU sends the BA information to the STA, to require the STA to retransmit the incorrect PSDU 1.1.

S805. The RRU determines whether a buffer margin is greater than a first preset threshold, for example, greater than 20%. Specifically, when determining that the buffer margin is greater than 20%, the RRU first performs S806 and then performs S807. When determining that the buffer margin is less than or equal to 20%, the RRU directly performs S807.

S806. The RRU performs first-level reordering. Specifically, after the RRU discards the incorrect PSDU 1.1, remaining third data packets include the PSDU 1.0, the PSDU 2.0, the PSDU 2.1, the PSDU 3.0, and the PSDU 3.1, and enter an internal buffer of the RRU.

S807. The RRU obtains a first data packet through encapsulation.

In a possible solution, because the internal buffer of the RRU is comparatively small, the RRU does not wait for the retransmitted PSDU 1.1, and may first reorder the PSDU 2.0, the PSDU 2.1, the PSDU 3.0, and the PSDU 3.1 to form the first data packet, and then send the first data packet. For example, the PSDU 2.0 and the PSDU 2.1 are reordered and encapsulated into a first data packet that includes a payload of the MPDU 2, and the PSDU 3.0 and the PSDU 3.1 are reordered and encapsulated into a first data packet that includes a payload of the MPDU 3. The first data packet includes sequence number information, a user ID and a TID. Sequence number information of the first data packet that includes the payload of the MPDU 2 may be a sequence number 2 of the MPDU; and sequence number information of the first data packet that includes the payload of the MPDU 3 may be a sequence number 3 of the MPDU. Alternatively, sequence number information of the first data packet that includes the payload of the MPDU 2 may be sequence numbers 2.0 and 2.1 of the PSDU and sequence number information of the first data packet that includes the payload of the MPDU 3 may be sequence numbers 3.0 and 3.1 of the PSDU. In this embodiment of this application, reordering (to be specific, first-level reordering) performed by the RRU may be reordering in a unit of one MPDU, that is, reordering in the MPDU.

In another possible solution, because the internal buffer of the RRU is comparatively small, the RRU does not wait for the retransmitted PSDU 1.1, and may first reorder the PSDU 1.0, the PSDU 2.0, the PSDU 2.1, the PSDU 3.0, and the PSDU 3.1 to form the first data packet, and then send the first data packet. For example, the PSDU 1.0, the PSDU 2.0, the PSDU 2.1, the PSDU 3.0, and the PSDU 3.1 each are encapsulated into one first data packet, where the first data packet includes a payload of each PSDU. The first data packet includes sequence number information, a user ID and a TID. For example, sequence number information of the first data packet that includes the payload of the PSDU 1.0 may be a sequence number 1.0 of the PSDU, sequence number information of another first data packet is similar, and details are not described herein again. In this embodiment of this application, the RRU does not perform reordering.

In still another possible solution, because the internal buffer of the RRU is comparatively small, the RRU does not wait for the retransmitted PSDU 1.1, and may first reorder the PSDU 2.0, the PSDU 2.1, the PSDU 3.0, and the PSDU 3.1 to form the first data packet, and then send the first data packet. For example, the PSDU 2.0, the PSDU 2.1, the PSDU 3.0, and the PSDU 3.1 are encapsulated into one first data packet, where the first data packet includes a payload of each PSDU. The first data packet includes sequence number information, a user ID and a TID. For example, the sequence number information of the first data packet may be sequence numbers 2.0, 2.1, 3.0, and 3.1 of the PSDUs. In this embodiment of this application, reordering (to be specific, first-level reordering) performed by the RRU may be reordering in a unit of a plurality of MPDUs (for example, N MPDUs).

Figure 10:
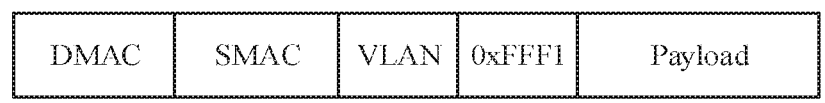
FIG. 10 is a schematic diagram of a frame structure of a first data packet according to an embodiment of this application.

The first data packet may be a customized Ethernet data packet. FIG. 10 is a schematic diagram of a frame structure of the first data packet according to an embodiment of this application. As shown in FIG. 10, a frame header of the first data packet includes the following fields: a destination MAC (destination mac, DMAC) address field, a source MAC (source MAC, SMAC) address field, a virtual local area network (virtual local area network, VLAN) identifier field, and a type identifier field (which may be, for example, 0×FFF1, used to indicate that a type of a data packet is the first data packet). The DMAC field and the SMAC field each may occupy six bytes, the VLAN field may occupy four bytes, and 0×FFF1 may occupy two bytes. A payload of the first data packet may include a data information part and a payload part, and the data information part may include the following fields: a user ID field, a TID field, a sequence number information field, and a flush field.

S808. The RRU sends the first data packet to a central AP.

S809. The central AP buffers the first data packet. After receiving the first data packet sent by the RRU, the central AP performs a CRC on the first data packet, then performs frame parsing, and performs reordering based on sequence information that is parsed out. If the received first data packet has empty data (to be specific, a sequence number is missing), the central AP buffers the received first data packet, and performs S810a or S810b. If the received first data packet has no empty data (to be specific, a sequence number is not missing), the central AP encapsulates the first data packet into a second data packet, and performs S814.

There are the following two cases after S810.

S810a. The RRU receives the retransmitted incorrect third data packet, for example, re-receives the PSDU 1.1.

S811a. The RRU performs first-level reordering, and obtains the first data packet through encapsulation. In a possible solution, the RRU reorders the buffered PSDU 1.0 and PSDU 1.1, and obtains the first data packet through encapsulation. In another possible solution, if the RRU has sent other data packets, for example, the PSDU 1.0, the PSDU 2.0, the PSDU 2.1, the PSDU 3.0, and the PSDU 3.1, the RRU encapsulates the PSDU 1.1 into the first data packet.

S812a. The RRU sends the first data packet that includes retransmitted data to the central AP.

S813a. The central AP performs second-level reordering on the originally buffered first data packet and the retransmitted first data packet, and obtains a second data packet through encapsulation. In a possible solution, the central AP reorders the first data packet including the PSDU 2.0, the PSDU 2.1, the PSDU 3.0, and the PSDU 3.1 and the first data packet including the PSDU 1.0 and the PSDU 1.1, and obtains, through encapsulation, a second data packet including the PSDU 1.0, the PSDU 1.1, the PSDU 2.0, the PSDU 2.1, the PSDU 3.0, and the PSDU 3.1. In another possible solution, the central AP reorders the first data packet including the PSDU 1.0, the PSDU 2.0, the PSDU 2.1, the PSDU 3.0, and the PSDU 3.1 and the first data packet including the PSDU 1.1, and obtains, through encapsulation, a second data packet including the PSDU 1.0, the PSDU 1.1, the PSDU 2.0, the PSDU 2.1, the PSDU 3.0, and the PSDU 3.1.

S810b. The RRU determines that the third data packet (the PSDU 1.1) that needs to be retransmitted cannot arrive or expires when arriving.

S811b. The RRU sends, to the central AP, a first data packet carrying a flush mark, to instruct the central AP not to wait for the incorrect data any longer for reordering, but to reorder the buffered data and send the reordered data to an upper-level device.

S812b. After receiving the first data packet carrying the flush mark, the central AP encapsulates the originally buffered first data packet to obtain a second data packet.

S814. The central AP sends the second data packet to the upper-level device.

The uplink data transmission methods in the embodiments of this application are described above in detail with reference to FIG. 6 to FIG. 10. Downlink data transmission methods in the embodiments of this application are described below in detail with reference to FIG. 11 to FIG. 12.

Figure 11:
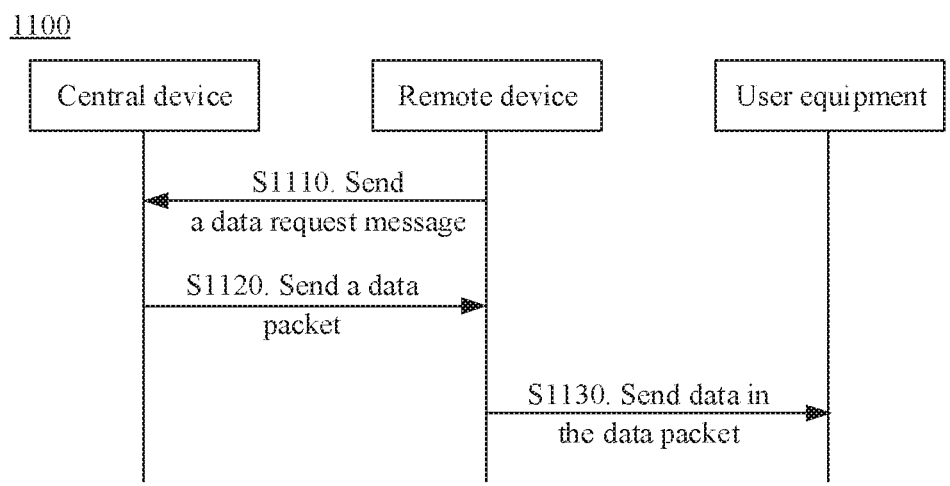
FIG. 11 is a schematic flowchart of a data transmission method according to an embodiment of this application.

FIG. 11 is a schematic flowchart of a data transmission method 1100 according to an embodiment of this application. FIG. 11 shows a downlink data transmission method, and the method 1100 may include the following steps.

S1110. A remote device sends a data request message to a central device, where the data request message includes information used to indicate an amount of data requested by the remote device. Correspondingly, the central device receives the data request message sent by the remote device.

S1120. The central device sends a data packet to the remote device based on the data request message. Correspondingly, the remote device receives the data packet sent by the central device.

S1130. The remote device sends data in the data packet to user equipment.

According to the data transmission method in this embodiment of this application, the central device receives the data request message sent by the remote device, where the data request message includes the information used to indicate the amount of the data requested by the remote device; and the central device sends the data packet to the remote device based on the information. In this way, when downlink data is transmitted, data does not overflow, and QoS resources of the remote device can be fully used, to be specific, some QoS resources can be shifted up to the central device on the premise that downlink data transmission is ensured, thereby saving QoS resources and reducing architecture costs.

Optionally, in an embodiment, the data packet may further include a user identifier user ID and a traffic identifier TID, the user identifier is used to indicate user equipment to which the data packet belongs, and the traffic identifier is used to indicate a traffic type corresponding to the data packet.

In a specific implementation process, the remote device may serve a plurality of user equipment, and may have a plurality of traffic types. The data packet carries the user ID and the TID, so that the remote device can send a data packet of a corresponding traffic type to corresponding user equipment based on the user identifier and the traffic identifier.

This embodiment of this application may be applied to a WLAN scenario, and the data packet sent by the central device to the remote device may be an 802.3 data packet.

In this embodiment of this application, the remote device requests the data based on usage of an internal buffer of the remote device. There may be a plurality of types of information used to indicate the amount of the data requested by the remote device. For example, the information may include information about a buffer margin of the remote device. The buffer margin may be indicated by a remaining proportion of the internal buffer, or may be indicated by a remaining absolute value of the internal buffer. Certainly, the buffer margin may alternatively be indirectly indicated by a usage proportion of the internal buffer or a usage absolute value of the internal buffer. This is not limited in this embodiment of this application. Alternatively, the information may include a maximum quantity of scheduled MSDUs and/or a maximum quantity of scheduled bytes. To be specific, the information used to indicate the amount of the data requested by the remote device is indicated by an amount of data that can be accommodated by the remote device.

Optionally, in this embodiment of this application, that the remote device sends a data request message to a central device in S1110 may include: sending, by the remote device, the data request message to the central device when the buffer margin of the remote device is greater than a second preset threshold. Specifically, based on a specific data transmission status and a size of a buffer (an internal buffer used for downlink) of the remote device, a system may preset the second preset threshold as a criterion for the remote device to determine whether to send the data request message to the central device. When the buffer margin of the remote device is greater than the second preset threshold, the remote device may receive a specific quantity of data packets, and ensure that data does not overflow. The buffer margin may be indicated by the remaining proportion of the internal buffer or may be indicated by the remaining absolute value of the internal buffer. Certainly, the buffer margin may alternatively be indirectly indicated by the usage proportion of the internal buffer or the usage absolute value of the internal buffer. This is not limited in this embodiment of this application.

Optionally, in this embodiment of this application, that the remote device sends data in the data packet to user equipment in S1130 may include: converting, by the remote device, the data packet into an MPDU; and sending, by the remote device, the MPDU to the user equipment. Specifically, the data packet sent by the central device to the remote device may be an 802.3 data packet, that is, a MAC service data unit (medium access control (MAC) service data unit, MSDU). The remote device converts the MSDU into an MPDU, and sends the MPDU to the user equipment.

It should be understood that, in this embodiment of this application, determining to transmit data of a specific traffic type of specific user equipment, that is, data scheduling, may be performed by the central device or the remote device. In a possible solution, the data request message further includes a user ID and a TID. To be specific, data scheduling is performed by the remote device. The remote device determines, based on the buffer margin, an air interface rate, channel quality, and the like, to schedule data of a specific traffic type of specific user equipment, and notifies the central device by using the data request message. In another possible solution, data scheduling is performed by the central device. The central device determines, based on the buffer margin, an air interface rate, and channel quality that are reported by the remote device, to schedule data of a specific traffic type of specific user equipment.

The following describes the data transmission method in this embodiment of this application in detail with reference to a specific example.

Figure 12:
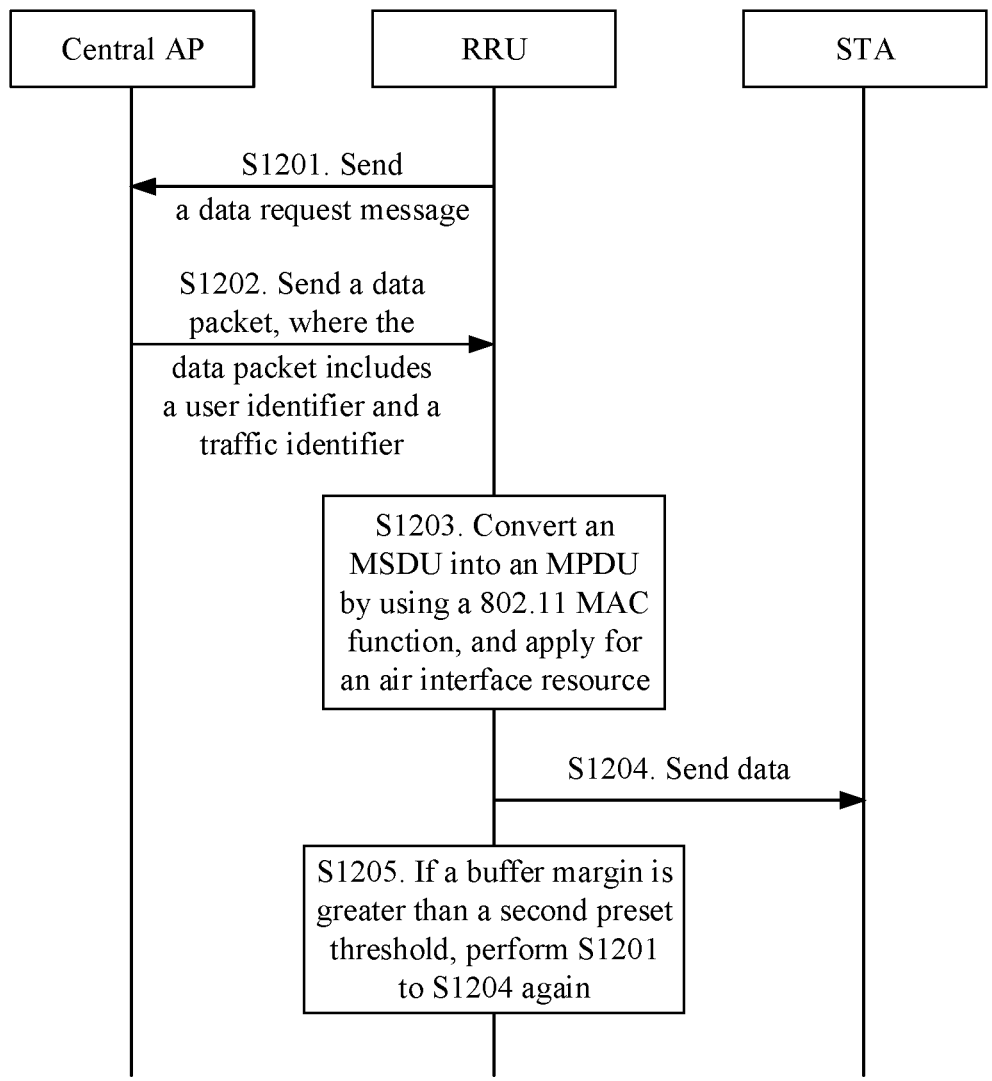
FIG. 12 is a schematic flowchart of a data transmission method according to an embodiment of this application.

FIG. 12 is a schematic flowchart of a data transmission method 1200 according to an embodiment of this application. As shown in FIG. 12, the method 1200 is applicable to a distributed Wi-Fi architecture, and the method 1200 includes the following steps.

Figure 13:
FIG. 13 is a schematic diagram of a frame structure of a data request message according to an embodiment of this application.

S1201. An RRU sends a data request message to a central AP. The data request message may include at least one of information such as a maximum quantity of scheduled MSDUs, a maximum quantity of scheduled bytes, and a buffer margin. If data scheduling is performed by the RRU, the data request message may further include a user ID and a TID. FIG. 13 is a schematic diagram of a frame structure of the data request message according to an embodiment of this application. A frame header of the data request message includes the following fields: a destination MAC (destination MAC, DMAC) address field, a source MAC (source MAC, SMAC) address field, a virtual local area network (virtual local area network, VLAN) identifier field, a type identifier field (which may be, for example, 0×FFF1, used to indicate that a type of a data packet is the data request message), and a data request field. The DMAC and the SMAC each may occupy six bytes, the VLAN may occupy four bytes, and 0×FFF1 may occupy two bytes. The data request field may include at least one of the information such as the maximum quantity of scheduled MSDUs, the maximum quantity of scheduled bytes, and the buffer margin, and may further include the user ID and the TID.

S1202. The central AP sends a data packet to the RRU. Specifically, the central AP packetizes to-be-sent data based on an amount of data required by the data request message, and sends the packetized to-be-sent data to the RRU. For a frame structure of the data packet, refer to the frame structure shown in FIG. 10. A frame header of the data packet may include the following fields: a DMAC field, an SMAC field, a VLAN identifier field, and a type identifier field (which may be, for example, 0×FFF1, used to indicate that a type of the data packet is a data packet). A payload of the data packet may include a data information part and a payload part, and the data information part may include a user ID and a TID. Compared with a conventional RRU, an existing RRU has a routing and forwarding function, and can parse a downlink data packet and forward the downlink data packet to a STA based on a MAC address in the data packet. However, the RRU in this embodiment of this application does not have the routing and forwarding function, and does not need a MAC entry any longer. The central AP notifies a user ID and a TID in the downlink data packet, the RRU sends data in the data packet to corresponding user equipment based on the information.

S1203. After receiving the delivered data packet, the RRU converts an MSDU into an MPDU by using an 802.11 MAC function, and starts to apply for an air interface resource, to send the MPDU to the STA.

S1204. The RRU sends data to the STA.

S1205. After the RRU sends the data, if a buffer margin of an internal buffer is greater than a second preset threshold, the RRU performs S1201 to S1204 again.

The foregoing describes the data transmission method provided in the embodiments of this application. The following describes a central device, a remote device, and a wireless network system provided in the embodiments of this application.

Figure 14:
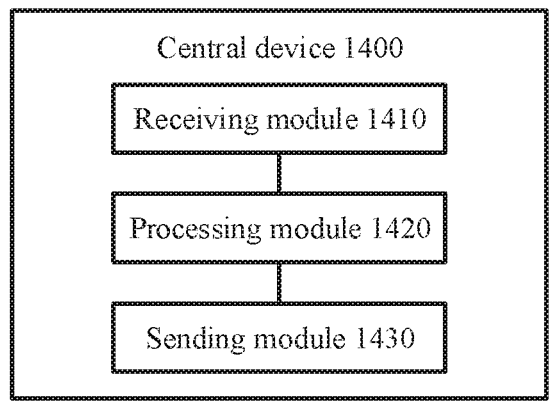
FIG. 14 is a schematic block diagram of a central device according to an embodiment of this application.

FIG. 14 is a schematic block diagram of a central device 1400 according to an embodiment of this application. A wireless network in which the central device 1400 is located further includes at least one remote device. The central device 1400 may include a receiving module 1410, a processing module 1420, and a sending module 1430.

In an embodiment, the receiving module 1410 is configured to receive at least one first data packet sent by a first remote device in the at least one remote device, where the first data packet includes sequence number information, and the sequence number information is used to indicate a relative location that is of a payload in the first data packet and that is in a to-be-transmitted second data packet.

The processing module 1420 is configured to reorder the at least one first data packet based on the sequence number information, to obtain the second data packet.

The sending module 1430 is configured to send the second data packet.

In this embodiment of this application, the central device receives the first data packet that is sent by the remote device and that includes the sequence number information, and reorders the first data packet based on the sequence number information, to obtain and send the second data packet, so that at least a part of reordering is performed by the central device. In this way, QoS resources can be shifted up to the central device on the premise that uplink data transmission is ensured, thereby saving QoS resources and reducing architecture costs.

Optionally, in an embodiment, the first data packet further includes a user identifier user ID and a traffic identifier TID, the first remote device is configured to serve first user equipment, the user identifier is used to indicate the first user equipment, and the traffic identifier is used to indicate a traffic type corresponding to the first data packet; and the processing module 1420 is specifically configured to reorder the at least one first data packet based on the user identifier, the traffic identifier, and the sequence number information, to obtain the second data packet of the traffic type of the first user equipment.

Optionally, in an embodiment, the central device may simultaneously process data of a plurality of user equipments and/or a plurality of traffic types. In this implementation, the first data packet carries the user ID and the TID, so that the central device can distinguish the user equipment and the traffic type that correspond to the data packet, and packetize data of a same traffic type of same user equipment into the second data packet.

Optionally, in an embodiment, the sequence number information is used to indicate a relative location that is of a payload of one or more physical layer convergence protocol PLCP service data units PSDUs in the first data packet and that is in the second data packet. In this embodiment, the payload of the first data packet received by the central device may use a PSDU as a minimum unit of a sequence number. This is consistent with a unit of a third data packet received by the remote device, thereby facilitating processing by the remote device. In this case, the remote device may be disposed with a very small internal buffer. The remote device uploads a data packet upon receiving the data packet, and reordering is not performed by the remote device but is performed only by the central device. This can ensure normal uplink data transmission.

Optionally, in an embodiment, the first data packet includes a payload of at least one physical layer convergence protocol PLCP service data unit PSDU. In this embodiment, the payload of the first data packet received by the central device may use a PSDU as a minimum processing unit. This is consistent with a unit of a third data packet received by the remote device, thereby facilitating processing by the remote device.

Optionally, in an embodiment, the sequence number information is used to indicate a relative location that is of a payload of an MPDU in the first data packet and that is in the second data packet. In this embodiment, the payload of the first data packet received by the central device may use an MPDU as a minimum unit of a sequence number. In this case, the remote device performs appropriate reordering on payloads of the received third data packet, and the remote device may use an idle internal buffer, so that processing load of the central device can be reduced.

Optionally, in an embodiment, the first data packet includes a payload of at least one media access control MAC layer protocol data unit MPDU. The remote device may perform appropriate reordering on payloads of the received third data packet, and may use an idle internal buffer, so that processing load of the central device can be reduced.

Optionally, in an embodiment, the first data packet further includes an output indication flush field, and the flush field is used to carry information that is used to instruct the central device to send the buffered second data packet. In this embodiment, a flush mechanism is designed, so that when an incorrect third data packet expires, the central device no longer waits for subsequent data after receiving a flush message, but reorders existing data, and sends the reordered data to an upper-level device. The flush mechanism enables the central device to release QoS resources under a specific condition, thereby increasing QoS resource utilization.

Optionally, in an embodiment, the second data packet is an 802.3 data packet.

In another embodiment, the receiving module 1410 is configured to receive at least one first data packet sent by a first remote device in at least one remote device, where the first data packet includes a user identifier user ID and a traffic identifier TID, the first remote device is configured to serve first user equipment, the user identifier is used to indicate the first user equipment, and the traffic identifier is used to indicate a traffic type corresponding to the first data packet.

The processing module 1420 is configured to reorder the at least one first data packet based on the user identifier and the traffic identifier, to obtain a second data packet.

The sending module 1430 is configured to send the second data packet.

In this embodiment of this application, the central device receives the first data packet that is sent by the remote device and that includes the user identifier and the traffic identifier of the user equipment, and reorders the first data packet based on the user identifier and the traffic identifier, to obtain and send the second data packet, so that at least a part of reordering is performed by the central device. In this way, QoS resources can be shifted up to the central device on the premise that uplink data transmission is ensured, thereby saving QoS resources and reducing architecture costs.

Optionally, in an embodiment, the first data packet further includes sequence number information, and the sequence number information is used to indicate a relative location that is of a payload in the first data packet and that is in the second data packet. The processing module 1420 is specifically configured to reorder the at least one first data packet based on the user identifier, the traffic identifier, and the sequence number information.

In this embodiment, the payload of the first data packet received by the central device may be out of order. In this embodiment, the sequence number information used to indicate the relative location of the payload in the first data packet is carried in the first data packet, and the central device performs reordering based on the sequence number information.

Figure 15:
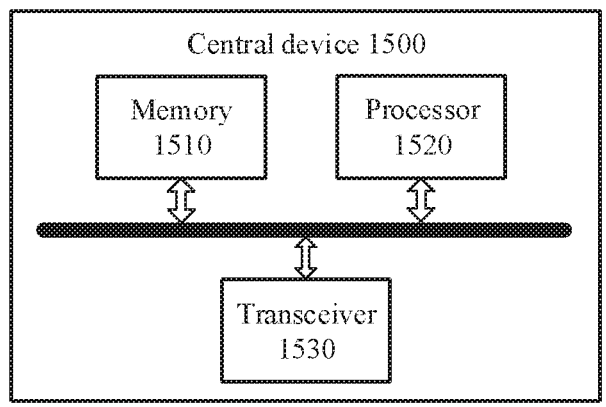
FIG. 15 is a schematic block diagram of a central device according to another embodiment of this application.

FIG. 15 is a schematic block diagram of a central device 1500 according to an embodiment of this application. The central device 1500 shown in FIG. 15 may include a memory 1510 and a processor 1520. The memory 1510 stores a computer instruction. When the processor 1520 executes the computer instruction, the central device 1500 is enabled to perform the following steps:

receiving at least one first data packet sent by a first remote device in at least one remote device, where the first data packet includes sequence number information, and the sequence number information is used to indicate a relative location that is of a payload in the first data packet and that is in a to-be-transmitted second data packet;

reordering the at least one first data packet based on the sequence number information, to obtain the second data packet; and sending the second data packet.

Optionally, in an embodiment, the first data packet further includes a user identifier user ID and a traffic identifier TID, the first remote device is configured to serve first user equipment, the user identifier is used to indicate the first user equipment, and the traffic identifier is used to indicate a traffic type corresponding to the first data packet; and when the processing module 1520 executes the computer instruction, the central device is enabled to specifically perform the following step: reordering the at least one first data packet based on the user identifier, the traffic identifier, and the sequence number information, to obtain the second data packet of the traffic type of the first user equipment.

In another embodiment, when the processor 1520 executes the computer instruction, the central device 1500 is enabled to perform the following steps: receiving at least one first data packet sent by a first remote device in at least one remote device, where the first data packet includes a user identifier user ID and a traffic identifier TID, the first remote device is configured to serve first user equipment, the user identifier is used to indicate the first user equipment, and the traffic identifier is used to indicate a traffic type corresponding to the first data packet;

reordering the at least one first data packet based on the user identifier and the traffic identifier, to obtain a second data packet; and sending the second data packet.

Optionally, in an embodiment, the first data packet further includes sequence number information, and the sequence number information is used to indicate a relative location that is of a payload in the first data packet and that is in the second data packet. When the processor 1520 executes the computer instruction, the central device 1500 is enabled to specifically perform the following step: reordering the at least one first data packet based on the user identifier, the traffic identifier, and the sequence number information.

When the processor 1520 executes the computer instruction, the central device 1500 may be enabled to specifically perform a related embodiment of the foregoing method, and details are not described herein again.

Optionally, the central device 1500 may further include a transceiver 1530, configured to receive or send data.

It should be understood that the central device 1400 shown in FIG. 14 or the central device 1500 shown in FIG. 15 may be configured to perform operations or procedures in the foregoing method embodiments, and operations and/or functions of modules and components in the central device 1400 or the central device 1500 are separately used to implement corresponding procedures in the foregoing method embodiments. For brevity, details are not described herein again.

Figure 16:
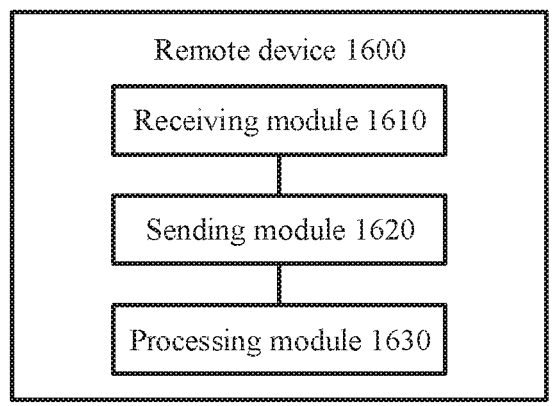
FIG. 16 is a schematic block diagram of a remote device according to an embodiment of this application.

FIG. 16 is a schematic block diagram of a remote device 1600 according to an embodiment of this application. A wireless network in which the remote device 1600 is located further includes a central device, and may also include another remote device. The remote device 1600 may include a receiving module 1610 and a sending module 1620.

In an embodiment, the receiving module 1610 is configured to receive at least one third data packet sent by first user equipment, where the remote device is configured to serve the first user equipment.

The sending module 1620 is configured to send at least one first data packet to the central device, where the first data packet includes sequence number information, and the sequence number information is used to indicate a relative location that is of a payload in the first data packet and that is in a second data packet to be transmitted by the central device, so that the central device reorders the at least one first data packet based on the sequence number information.

In this embodiment of this application, after receiving the third data packet sent by the user equipment, the remote device sends the first data packet including the third data packet to the central device, where the first data packet carries the sequence number information of the user equipment, so that the central device reorders the received first data packet based on the sequence number information, and at least a part of reordering is performed by the central device. In this way, QoS resources can be shifted up to the central device on the premise that uplink data transmission is ensured, thereby saving QoS resources and reducing architecture costs.

Optionally, in an embodiment, the first data packet further includes a user identifier user ID and a traffic identifier TID, the user identifier is used to indicate the first user equipment, and the traffic identifier is used to indicate a traffic type corresponding to the first data packet.

Optionally, in an embodiment, the sequence number information is used to indicate a relative location that is of a payload of one or more physical layer convergence protocol PLCP service data units PSDUs in the first data packet and that is in the second data packet.

Optionally, in an embodiment, the remote device 1600 may further include a processing module 1630. The processing module 1630 is configured to encapsulate some or all payloads of the at least one third data packet into the first data packet before the sending module 1620 sends the at least one first data packet to the central device. In this case, the remote device may be disposed with a very small internal buffer. The remote device uploads a data packet upon receiving the data packet, and reordering is not performed by the remote device but is performed only by the central device. This can ensure normal uplink data transmission.

Optionally, in an embodiment, the processing module 1630 is specifically configured to encapsulate the sonic or all payloads of the at least one third data packet into the first data packet after reordering the some or all payloads of the at least one third data packet.

Optionally, in an embodiment, the first data packet includes a payload of at least one physical laser convergence protocol PLCP service data unit PSDU.

Optionally, in an embodiment, the first data packet includes a payload of at least one media access control MAC layer protocol data unit MPDU. In this case, the remote device performs appropriate reordering on the payloads of the received third data packet, and the remote device may use an idle internal buffer, so that processing load of the central device can be reduced.

Optionally, in an embodiment, before the sending module 1620 sends the at least one first data packet to the central device, the processing module 1630 is further configured to: when a buffer margin is greater than a first preset threshold, encapsulate the some or all payloads of the at least one third data packet into the first data packet after reordering the some or all payloads of the at least one third data packet, where the first data packet includes a payload of at least one media access control MAC layer protocol data unit MPDU; or when a buffer margin is less than or equal to a first preset threshold, encapsulate the some or all payloads of the at least one third data packet into the first data packet, where the first data packet includes a payload of at least one physical layer convergence protocol PLCP service data unit PSDU. In this embodiment, the remote device determines usage of the internal buffer of the remote device, and chooses, based on the usage, to reorder or not to reorder payloads of a plurality of third data packets. In this way, QoS resources of the remote device can be fully used, and QoS resources can be saved to a greater extent.

Optionally, in an embodiment, the first data packet further includes an output indication flush field, and the flush field is used to carry information that is used to instruct the central device to send the buffered second data packet.

Optionally, in an embodiment, the third data packet is an 802.11 data packet.

Optionally, in an embodiment, the second data packet is an 802.3 data packet.

In another embodiment, the receiving module 1610 is configured to receive at least one third data packet sent by first user equipment.

The sending module 1620 is configured to send at least one first data packet to the central device, where the first data packet includes some or all payloads of the at least one third data packet, the first data packet includes a user identifier user ID and a traffic identifier TID, the remote device is configured to serve first user equipment, the user identifier is used to indicate the first user equipment, and the traffic identifier is used to indicate a traffic type corresponding to the first data packet.

In this embodiment of this application, after receiving the third data packet sent by the user equipment, the remote device sends the first data packet including the third data packet to the central device, where the first data packet carries the user identifier and the traffic identifier of the user equipment, so that the central device reorders the received first data packet based on the user identifier and the traffic identifier, and at least a part of reordering is performed by the central device. In this way, QoS resources can be shifted up to the central device on the premise that uplink data transmission is ensured, thereby saving QoS resources and reducing architecture costs.

Optionally, in an embodiment, the first data packet further includes sequence number information, and the sequence number information is used to indicate a relative location that is of a payload in the first data packet and that is in a second data packet to be transmitted by the central device, so that the central device reorders the at least one first data packet based on the user identifier and the sequence number information.

Figure 17:
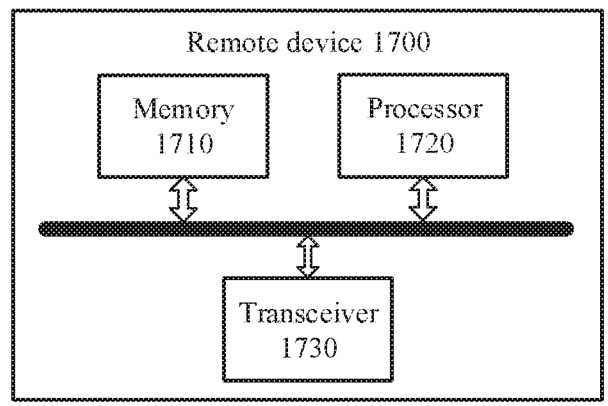
FIG. 17 is a schematic block diagram of a remote device according to another embodiment of this application.

FIG. 17 is a schematic block diagram of a remote device 1700 according to an embodiment of this application. The remote device 1700 shown in FIG. 17 may include a memory 1710 and a processor 1720. The memory 1710 stores a computer instruction. When the processor 1720 executes the computer instruction, the remote device 1700 is enabled to perform the following steps:

receiving at least one third data packet sent by first user equipment, where the remote device is configured to serve the first user equipment; and sending at least one first data packet to the central device, where the first data packet includes some or all payloads of the at least one third data packet, the first data packet includes sequence number information, and the sequence number information is used to indicate a relative location that is of a payload in the first data packet and that is in a second data packet to be transmitted by the central device, so that the central device reorders the at least one first data packet based on the sequence number information.

Optionally, in an embodiment, the first data packet further includes a user identifier user ID and a traffic identifier TID, the user identifier is used to indicate the first user equipment, and the traffic identifier is used to indicate a traffic type corresponding to the first data packet.

Optionally, in an embodiment, before the at least one first data packet is sent to the central device, the processor 1720 is further configured to execute the computer instruction, so that the remote device 1700 performs the following step: encapsulating the some or all payloads of the at least one third data packet into the first data packet.

Optionally, in an embodiment, when the processor 1720 executes the computer instruction, the remote device 1700 is enabled to specifically perform the following step: encapsulating the some or all payloads of the at least one third data packet into the first data packet after reordering the some or all payloads of the at least one third data packet.

Optionally, in an embodiment, before the at least one first data packet is sent to the central device, the processor 1720 is further configured to execute the computer instruction, so that the remote device 1700 performs the following step: when a buffer margin is greater than a first preset threshold, encapsulating the some or all payloads of the at least one third data packet into the first data packet after reordering the some or all payloads of the at least one third data packet, where the first data packet includes a payload of at least one media access control MAC layer protocol data unit MPDU; or when a buffer margin is less than or equal to a first preset threshold, encapsulating the some or all payloads of the at least one third data packet into the first data packet, where the first data packet includes a payload of at least one physical layer convergence protocol PLCP service data unit PSDU.

In another embodiment, when the processor 1720 executes the computer instruction, the remote device 1700 is enabled to perform the following steps: receiving at least one first data packet sent by a first remote device in at least one remote device, where the first data packet includes a user identifier user ID and a traffic identifier TID, the first remote device is configured to serve first user equipment, the user identifier is used to indicate the first user equipment, and the traffic identifier is used to indicate a traffic type corresponding to the first data packet; and reordering the at least one first data packet based on the user identifier and the traffic identifier, to obtain a second data packet; and sending the second data packet.

Optionally, in an embodiment, the first data packet further includes sequence number information, and the sequence number information is used to indicate a relative location that is of a payload in the first data packet and that is in the second data packet to be transmitted by the central device, so that the central device reorders the at least one first data packet based on the user identifier and the sequence number information.

When the processor 1720 executes the computer instruction, the remote device 1700 may be enabled to specifically perform a related embodiment of the foregoing method, and details are not described herein again.

Optionally, the remote device 1700 may further include a transceiver 1730, configured to receive or send data.

It should be understood that the remote device 1600 shown in FIG. 16 or the remote device 1700 shown in FIG. 17 may be configured to perform operations or procedures in the foregoing method embodiments, and operations and/or functions of modules and components in the remote device 1600 or the remote device 1700 are separately used to implement corresponding procedures in the foregoing method embodiments. For brevity, details are not described herein again.

Figure 18:
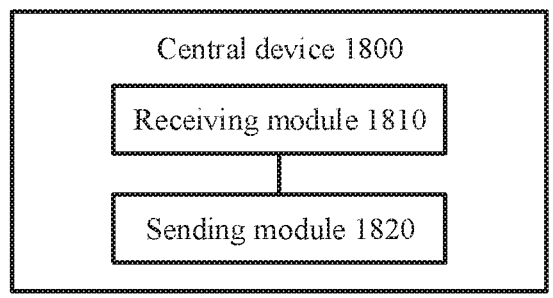
FIG. 18 is a schematic block diagram of a central device according to an embodiment of this application.

FIG. 18 is a schematic block diagram of a central device 1800 according to an embodiment of this application. A wireless network in which the central device 1800 is located further includes at least one remote device. The central device 1800 may include a receiving module 1810 and a sending module 1820.

The receiving module 1810 is configured to receive a data request message sent by the remote device, where the data request message includes information used to indicate an amount of data requested by the remote device.

The sending module 1820 is configured to send a data packet to the remote device based on the data request message.

In this embodiment of this application, the central device receives the data request message sent by the remote device, where the data request message includes the information used to indicate the amount of the data requested by the remote device; and the central device sends the data packet to the remote device based on the information. In this way, when downlink data is transmitted, data does not overflow, and QoS resources of the remote device can be fully used, to be specific, some QoS resources can be shifted up to the central device on the premise that downlink data transmission is ensured, thereby saving QoS resources and reducing architecture costs.

Optionally, in an embodiment, the data packet further includes a user identifier user ID and a traffic identifier TID, the user identifier is used to indicate user equipment to which the data packet belongs, and the traffic identifier is used to indicate a traffic type corresponding to the data packet.

Optionally, in an embodiment, the information used to indicate the amount of the data requested by the remote device includes information about a buffer margin of the remote device.

Optionally, in an embodiment, the information used to indicate the amount of the data requested by the remote device includes a maximum quantity of scheduled media access control MAC layer service data units MSDUs and/or a maximum quantity of scheduled bytes.

Optionally, in an embodiment, the data packet is an 802.3 data packet.

Figure 19:
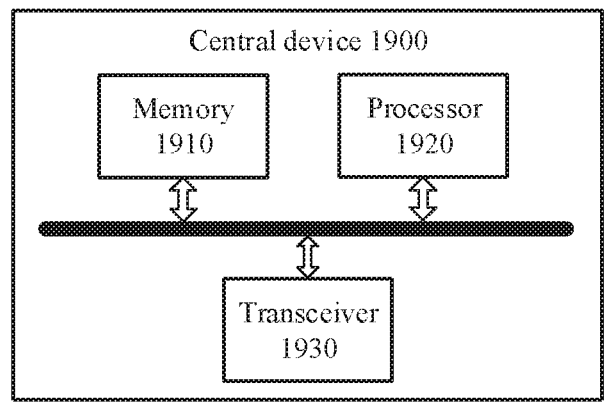
FIG. 19 is a schematic block diagram of a central device according to another embodiment of this application.

FIG. 19 is a schematic block diagram of a central device 1900 according to an embodiment of this application. The central device 1900 shown in FIG. 19 may include a memory 1910 and a processor 1920. The memory 1910 stores a computer instruction. When the processor 1920 executes the computer instruction, the central device 1900 is enabled to perform the following steps: receiving a data request message sent by a remote device, where the data request message includes information used to indicate an amount of data requested by the remote device; and sending a data packet to the remote device based on the data request message.

Optionally, in an embodiment, the data packet further includes a user identifier user ID and a traffic identifier TID, the user identifier is used to indicate user equipment to which the data packet belongs, and the traffic identifier is used to indicate a traffic type corresponding to the data packet.

When the processor 1920 executes the computer instruction, the central device 1900 may be enabled to specifically perform a related embodiment of the foregoing method, and details are not described herein again.

Optionally, the central device 1900 may further include a transceiver 1930, configured to receive or send data.

It should be understood that the central device 1800 shown in FIG. 18 or the central device 1900 shown in FIG. 19 may be configured to perform operations or procedures in the foregoing method embodiments, and operations and/or functions of modules and components in the central device 1800 or the central device 1900 are separately used to implement corresponding procedures in the foregoing method embodiments. For brevity, details are not described herein again.

Figure 20:
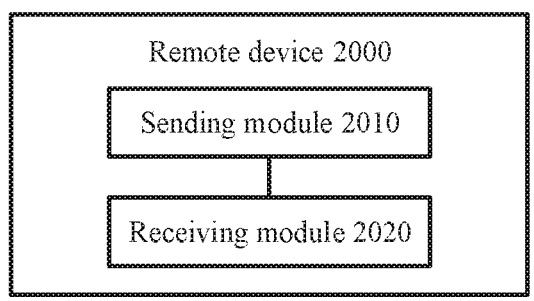
FIG. 20 is a schematic block diagram of a remote device according to an embodiment of this application.

FIG. 20 is a schematic block diagram of a remote device 2000 according to an embodiment of this application. A wireless network in which the remote device 2000 is located further includes a central device, and may also include another remote device. The remote device 2000 may include a sending module 2010 and a receiving module 2020.

The sending module 2010 is configured to send a data request message to the central device, where the data request message includes information used to indicate an amount of data requested by the remote device.

The receiving module 2020 is configured to receive a data packet sent by the central device. The sending module 2010 is further configured to send data in the data packet to user equipment.

In this embodiment of this application, the remote device sends the data request message to the central device, where the data request message includes the information used to indicate the amount of the data requested by the remote device; the central device sends a corresponding quantity of data packets to the remote device; and the remote device forwards data in the data packets. In this way, when downlink data is transmitted, data does not overflow, and QoS resources of the remote device can be fully used, to be specific, some QoS resources can be shifted up to the central device on the premise that downlink data transmission is ensured, thereby saving QoS resources and reducing architecture costs.

Optionally, in an embodiment, the data packet further includes a user identifier user ID and a traffic identifier TID, the user identifier is used to indicate user equipment to which the data packet belongs, and the traffic identifier is used to indicate a traffic type corresponding to the data packet.

Optionally, in an embodiment, the information used to indicate the amount of the data requested by the remote device includes information about a buffer margin of the remote device.

Optionally, in an embodiment, the information used to indicate the amount of the data requested by the remote device includes a maximum quantity of scheduled media access control MAC layer service data units MSDUs and/or a maximum quantity of scheduled bytes.

Optionally, in an embodiment, the sending module 2010 is specifically configured to send the data request message to the central device when the buffer margin of the remote device is greater than a second preset threshold.

Optionally, in an embodiment, the data packet is an 802.3 data packet.

Optionally, in an embodiment, the sending module 2010 is specifically configured to: convert the data packet into a media access control MAC layer protocol data unit MPDU; and send the MPDU to the user equipment.

Figure 21:
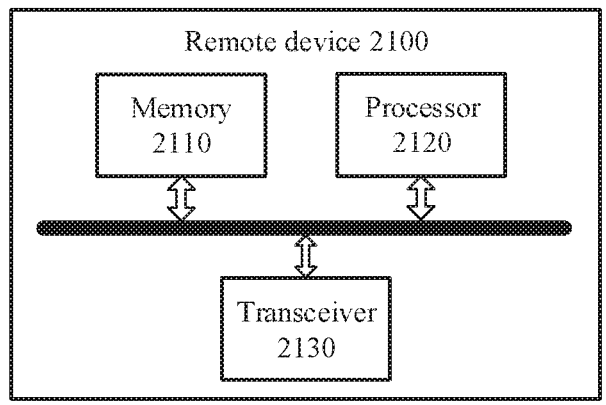
FIG. 21 is a schematic block diagram of a remote device according to another embodiment of this application.

FIG. 21 is a schematic block diagram of a remote device 2100 according to an embodiment of this application. The remote device 2100 shown in FIG. 21 may include a processor 2120 and a memory 2110. The memory 2110 stores a computer instruction. When the processor 2120 executes the computer instruction, the remote device 2100 is enabled to perform the following steps:

sending a data request message to a central device, where the data request message includes information used to indicate an amount of data requested by the remote device;

receiving a data packet sent by the central device; and sending data in the data packet to user equipment.

Optionally, in an embodiment, the data packet further includes a user identifier user ID and a traffic identifier TID, the user identifier is used to indicate user equipment to which the data packet belongs, and the traffic identifier is used to indicate a traffic type corresponding to the data packet.

Optionally, in an embodiment, when the processor 2120 executes the computer instruction, the remote device 2100 is enabled to specifically perform the following step: sending the data request message to the central device when a buffer margin of the remote device is greater than a second preset threshold.

Optionally, in an embodiment, when the processor 2120 executes the computer instruction, the remote device 2100 is enabled to specifically perform the following steps: converting the data packet into a media access control MAC layer protocol data unit MPDU; and sending the MPDU to the user equipment.

When the processor 2120 executes the computer instruction, the remote device 2100 may be enabled to specifically perform a related embodiment of the foregoing method, and details are not described herein again.

Optionally, the remote device 2100 may further include a transceiver 2130, configured to receive or send data.

It should be understood that the remote device 2000 shown in FIG. 20 or the remote device 2100 shown in FIG. 21 may be configured to perform operations or procedures in the foregoing method embodiments, and operations and/or functions of modules and components in the remote device 2000 or the remote device 2100 are separately used to implement corresponding procedures in the foregoing method embodiments. For brevity, details are not described herein again.

It should be understood that, the processor mentioned in the embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA), or another programmable logical device, discrete gate or transistor logical device, discrete hardware component, or the like. The general-purpose processor may be a microprocessor, or the processor may be any conventional processor or the like.

It may be understood that the memory mentioned in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By using example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA, or another programmable logic device, discrete gate, transistor logic device, or discrete hardware component, the memory (storage module) is integrated into the processor.

It should be noted that the memory described in this specification includes but is not limited to these and any memory of another proper type.

An embodiment of this application further provides a computer-readable storage medium. The computer-readable storage medium stores an instruction. When the instruction is run on a computer, the computer is enabled to perform the data transmission method in the foregoing method embodiments.

An embodiment of this application further provides a computer program product that includes an instruction. When a computer runs the instruction of the computer program product, the computer performs the data transmission method in the foregoing method embodiments.

An embodiment of this application further provides a wireless network system, including a central device in the embodiments of this application and at least one remote device in the embodiments of this application.

It should be understood that in the embodiments of this application, the wireless network may be a WLAN, the central device may be a central AP, and the remote device may be an RRU or an RU.

It should be understood that, in the aspects of this application and the corresponding implementations, no external buffer is disposed on the remote device, and an external buffer is disposed on the central device.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium (for example, a digital video disc (digital video disc, DVD), a semiconductor medium (for example, a solid-state drive (solid-state disk, SSD)), or the like.

It should be understood that first, second, and various serial numbers in this specification are merely for purpose of distinction for ease of description, but are not intended to limit the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using sonic interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application, Therefore, the protection scope of this application shall be subject to the protection scope of the claims.

The invention claimed is:

1. A data transmission method comprising:
receiving, by a central device of a wireless network, at least one first data packet sent by a remote device of the wireless network, wherein each of the at least one first data packet comprises a sequence number indicating a relative location of a payload of the corresponding first data packet in a second data packet;
reordering, by the central device, the at least one first data packet, based on the sequence number of each of the at least one first data packet, to obtain the second data packet; and
sending, by the central device, the second data packet.

2. The method according to claim 1, wherein each of the at least one first data packet further comprises a user identifier (ID) and a traffic identifier (TID), the remote device serves a user equipment, the user ID identifies the user equipment, and the TID identifies a traffic type corresponding to each of the at least one first data packet; and the reordering the at least one first data packet is further based on the user ID and the TID.

3. The method according to claim 1, wherein the payload is a payload of one or more physical layer convergence protocol (PLCP) service data units (PSDUs) in the corresponding first data packet.

4. The method according to claim 1, wherein each of the at least one first data packet further comprises an output indication flush field that carries one or more instructions to instruct the central device to send the second data packet that is buffered by the central device during a predetermined period of time.

5. The method according to claim 1, wherein each of the at least one first data packet comprises a payload of at least one media access control (MAC) layer protocol data unit (MPDU).

6. A central device of a wireless network comprising:
at least one processor and a memory, the memory stores one or more programming instructions executable by the at least one processor, the one or more programming instructions instruct the central device to perform operations comprising:
receiving at least one first data packet sent by a remote device of the wireless network, wherein each of the at least one first data packet comprises a sequence number indicating a relative location of a payload of the corresponding first data packet in a second data packet;
reordering the at least one first data packet, based on the sequence number of each of the at least one first data packet, to obtain the second data packet; and
sending the second data packet.

7. The central device according to claim 6, wherein each of the at least one first data packet further comprises a user identifier (ID) and a traffic identifier (TID), the remote device serves a user equipment, the user ID identifies the user equipment, and the TID identifies a traffic type corresponding to each of the at least one first data packet; and the reordering the at least one first data packet is further based on the user ID and the TID.

8. The central device according to claim 6, wherein the payload is a payload of one or more physical layer convergence protocol (PLCP) service data units (PSDUs) in the corresponding first data packet.

9. The central device according to claim 6, wherein each of the at least one first data packet further comprises an output indication flush field that carries one or more instructions to instruct the central device to send the second data packet that is buffered.

10. The central device according to claim 6, wherein each of the at least one first data packet comprises a payload of at least one media access control (MAC) layer protocol data unit (MPDU).

11. A remote device of a wireless network comprising at least one processor and a memory, the memory stores one or more programming instructions executable by the at least one processor, the one or more programming instructions instruct the remote device to perform operations comprising:
receiving at least one third data packet sent by a user equipment, wherein the remote device is configured to serve the user equipment; and
sending at least one first data packet to a central device of the wireless network, wherein each of the at least one first data packet comprises a sequence number indicating a relative location of a payload of the corresponding first data packet in a second data packet for the central device to reorder the at least one first packet to obtain the second data packet based on the sequence number.

12. The remote device according to claim 11, wherein each of the at least one first data packet further comprises a user identifier (ID) and a traffic identifier (TID), the remote device serves a first user equipment, the user ID identifies the first user equipment, and the TID identifies a traffic type corresponding to each of the at least one first data packet.

13. The remote device according to claim 11, wherein the payload is a payload of one or more physical layer convergence protocol (PLCP) service data units (PSDUs) in the corresponding first data packet.

14. The remote device according to claim 11, wherein the operations further comprising:
before the at least one first data packet is sent to the central device, encapsulating at least a portion of a payload of the at least one third data packet into the corresponding first data packet.

15. The remote device according to claim 14, wherein the encapsulating the at least a portion of the payload into each of the at least one first data packet is performed after reordering the at least a portion of payload of the at least one third data packet.

16. The remote device according to claim 11, wherein each of the at least one first data packet comprises a payload of at least one media access control (MAC) layer protocol data unit (MPDU).

17. The remote device according to claim 11, wherein the operations further comprising:
- in response to determining that a buffer margin of the remote device is greater than a first preset threshold, encapsulating at least a portion of a payload of the at least one third data packet into the corresponding first data packet before the at least one first data packet is sent to the central device and after reordering the at least a portion of payload of the at least one third data packet, wherein each of the at least one first data packet comprises a payload of at least one media access control (MAC) layer protocol data unit (MPDU); or
- in response to determining that a buffer margin of the remote device is less than or equal to the first preset threshold, encapsulating the at least a portion of payload of the at least one third data packet into the corresponding first data packet, wherein each of the at least one first data packet comprises a payload of at least one physical layer convergence protocol (PLCP) service data unit (PSDU).

* * * * *